United States Patent [19]

Kashiwazaki et al.

[11] Patent Number: 5,716,739
[45] Date of Patent: Feb. 10, 1998

[54] PROCESS FOR PRODUCING A COLOR FILTER

[75] Inventors: Akio Kashiwazaki; Hiroshi Sato, both of Yokohama; Katsuhiro Shirota, Kawasaki; Hideto Yokoi, Yokohama; Takeshi Miyazaki, Ebina; Shoji Shiba, Sagamihara, all of Japan

[73] Assignee: Canon Kabushiki Kaisha, Tokyo, Japan

[21] Appl. No.: 536,781

[22] Filed: Sep. 29, 1995

[30] Foreign Application Priority Data

Sep. 30, 1994 [JP] Japan ................ 6-237096
Dec. 22, 1994 [JP] Japan ................ 6-319991
Sep. 26, 1995 [JP] Japan ................ 7-247970

[51] Int. Cl.⁶ .......................... G02B 5/20; G02F 1/1335
[52] U.S. Cl. .......................... 430/7; 430/321; 347/106; 427/492; 427/493; 427/511; 427/512; 427/164
[58] Field of Search ...................... 430/7, 321; 347/105, 347/102, 107, 106; 427/492, 493, 511, 512, 558, 559, 164, 261; 349/106

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,418,284 | 11/1983 | Ogawa et al. | 250/578 |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,698,113 | 10/1987 | Ogawa | 156/275.7 |
| 4,723,129 | 2/1988 | Endo et al. | 346/1.1 |
| 4,740,796 | 4/1988 | Endo et al. | 346/1.1 |
| 4,818,075 | 4/1989 | Takao et al. | 350/339 F |
| 4,846,556 | 7/1989 | Haneda | 350/317 |
| 4,864,324 | 9/1989 | Shirota et al. | 346/1.1 |
| 4,965,612 | 10/1990 | Sakaki et al. | 346/1.1 |
| 4,981,614 | 1/1991 | Miyazaki et al. | 252/587 |
| 4,995,705 | 2/1991 | Yoshinaga et al. | 350/350 |
| 5,002,825 | 3/1991 | Mimura et al. | 428/315.5 |
| 5,011,623 | 4/1991 | Yoshinaga et al. | 252/299.5 |
| 5,039,208 | 8/1991 | Ohnishi et al. | 359/100 |
| 5,079,214 | 1/1992 | Long et al. | 503/227 |
| 5,096,801 | 3/1992 | Koya et al. | 430/293 |
| 5,190,794 | 3/1993 | Yoshino et al. | 427/162 |
| 5,278,009 | 1/1994 | Iida et al. | 430/7 |
| 5,281,450 | 1/1994 | Yaniv | 427/165 |
| 5,317,434 | 5/1994 | Ohara | 359/68 |
| 5,340,619 | 8/1994 | Chen et al. | 427/165 |
| 5,358,558 | 10/1994 | Yamamoto et al. | 106/22 R |
| 5,418,094 | 5/1995 | Sato et al. | 430/7 |
| 5,420,708 | 5/1995 | Yokoyama et al. | 359/67 |

FOREIGN PATENT DOCUMENTS

| | | |
|---|---|---|
| 0371398 | 6/1990 | European Pat. Off. . |
| 0400681 | 12/1990 | European Pat. Off. . |
| 0400738 | 12/1990 | European Pat. Off. . |
| 0552035 | 7/1993 | European Pat. Off. . |
| 0655647 | 5/1995 | European Pat. Off. . |
| 54-056847 | 5/1979 | Japan . |
| 01235903 | 9/1982 | Japan . |
| 59-123670 | 7/1984 | Japan . |
| 59-138461 | 8/1984 | Japan . |
| 60-71260 | 4/1985 | Japan . |
| 61-77014 | 4/1986 | Japan . |
| 63-294503 | 12/1988 | Japan . |
| 01217302 | 8/1989 | Japan . |
| 02173703 | 7/1990 | Japan . |
| 02228605 | 9/1990 | Japan . |
| 03 10220 | 1/1991 | Japan . |
| 04317007 | 11/1992 | Japan . |
| 04349401 | 12/1992 | Japan . |
| 05173010 | 7/1993 | Japan . |
| 05288913 | 11/1993 | Japan . |
| 93 24240 | 12/1993 | WIPO . |

OTHER PUBLICATIONS

Patent Abstracts of Japan, vol. 13, No. 530 (Nov. 1989) (P–966).
Patent Abstracts of Japan, vol. 16, No. 382 (Aug. 1992) (P–1403).
Patent Abstracts of Japan, vol. 16, No. 197 (May 1992) (P–1350).
Patent Abstracts of Japan, vol. 17, No. 526 (Sep. 1993) (P–1617).
Patent Abstracts of Japan, vol. 17, No. 703 (Dec. 1993) (P–1666).
Patent Abstracts of Japan, vol. 8, No. 183 (Aug. 1984) (P–296).
Patent Abstracts of Japan, vol. 13, No. 37 (Jan. 1989) (819).

*Primary Examiner*—John A. McPherson
*Attorney, Agent, or Firm*—Fitzpatrick, Cella, Harper & Scinto

[57] ABSTRACT

Disclosed herein is a color filter comprising a base equipped with light-transmitting areas, and an ink-receiving layer provided on the base and equipped with colored light-transmitting areas on the light-transmitting areas of the base, wherein the ink-receiving layer comprises a homopolymer of a monomer having a structural unit represented by the formula:

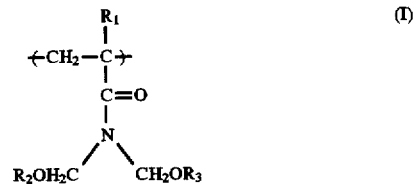

wherein $R_1$ denotes hydrogen or a methyl group, and $R_2$ and $R_3$ are, independently of each other, hydrogen or an alkyl group having 1 to 5 carbon atoms, or its copolymer with one or more other vinyl monomers.

25 Claims, 11 Drawing Sheets

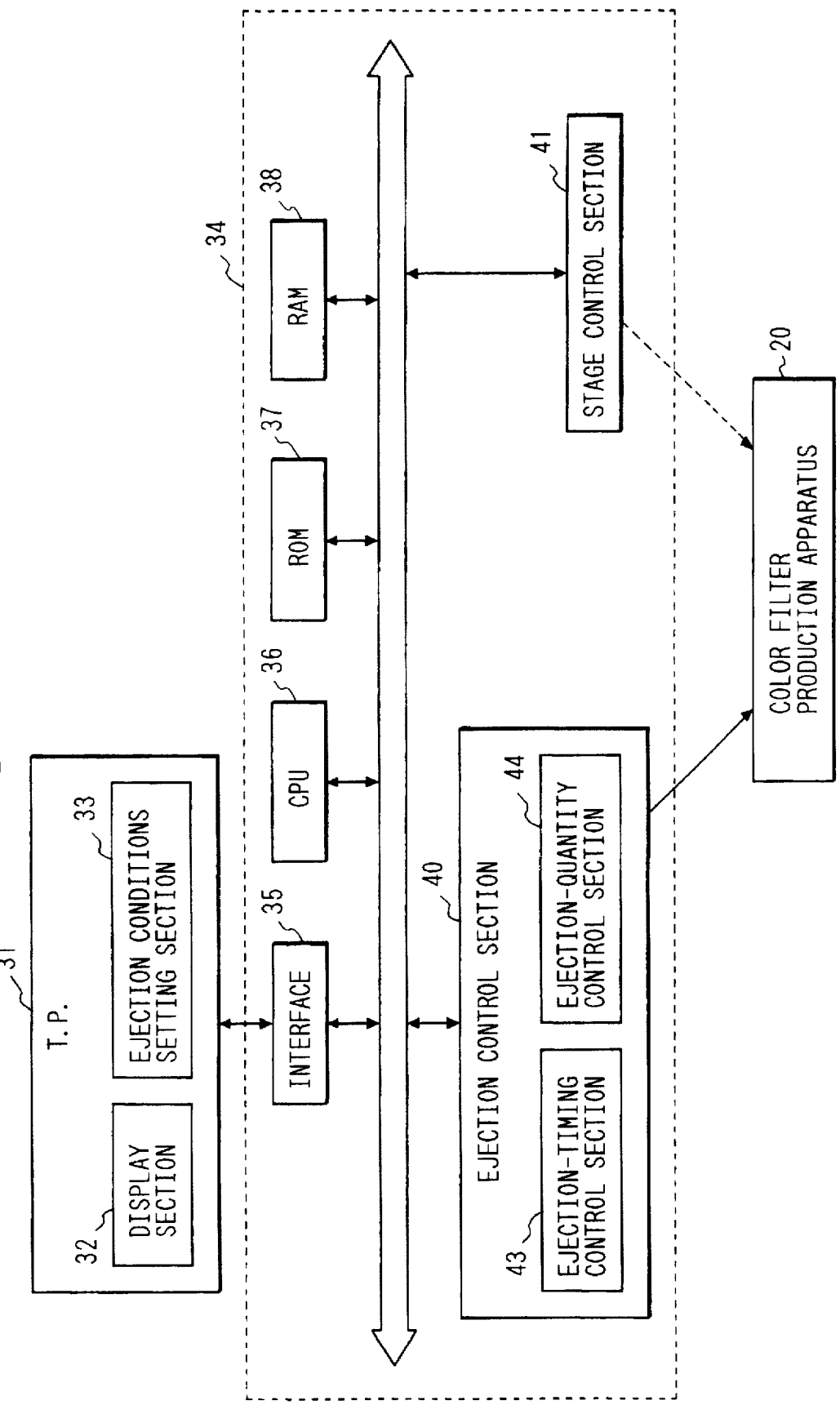

PROCESS FOR PRODUCING A COLOR FILTER

BACKGROUND OF THE INVENTION

1. Field of the Invention

The present invention relates to a color filter suitable for use in color liquid crystal display device used in color televisions, car televisions, personal computers and the like, a production process thereof, a liquid crystal display panel, and an information processor equipped with the panel, and particularly to a production process of a color filter for liquid crystal display device using an ink-jet recording technique.

2. Related Background Art

With the advancement of personal computers, particularly, portable personal computers in recent years, the demand for liquid crystal display devices, particularly, color liquid crystal display devices tends to increase. It is however necessary to reduce the cost of the color liquid crystal display devices for further spreading them. There is an increasing demand for reduction in the cost of color filters particularly given much weight from the viewpoint of the cost.

Various methods have heretofore been attempted for meeting the above demand while satisfying properties required of the color filters. However, no method satisfying all the required properties is yet established under the circumstances. The individual methods will hereinafter be described.

The first method oftenest used is a dyeing process. In the dyeing process, a water-soluble polymeric material, which is a material to be dyed, is applied to a glass base, and the coating film thus formed is patterned in the desired form by a photolithographic process. Thereafter, the base on which the coating film has been patterned is immersed in a dye bath to obtain a colored pattern. This process is repeatedly performed three times to form a color filter composed of colored patterns of red (R), green (G) and blue (B).

The second method is a pigment dispersing process which has been replacing the dyeing process in recent years. In this process, a layer of a photosensitive resin in which a pigment has been dispersed is first formed on a base and then subjected to patterning, thereby obtaining a pattern of a single color. This process is repeatedly performed three times, thereby forming a color filter composed of colored patterns of R, G and B.

As the third method, there is an electrodepostion process. In this process, a transparent electrode is first patterned on a base. The base is then immersed in an electrodeposition coating fluid containing a pigment, resin, electrolytic solution and the like to electrically deposit the first color. This process is repeatedly performed three times, thereby forming a color filter layer composed of colored patterns of R, G and B. Finally, this color filter layer is calcined to form a color filter.

As the fourth method, there is a printing process in which three coatings of R, G and B colors, each comprising a thermosetting resin and a pigment dispersed therein, are separately applied by repeated printing, and the resin to become each colored layer is then thermoset to form a colored layer, thereby forming a color filter.

It is general to form a protective layer on the colored layer in each process.

The need of repeating the same process three times to form the colored patterns of R, G and B is common to these processes. Therefore, the production cost is necessarily increased. There is also offered a problem that a yield is reduced as the number of processes increases. In the electrodeposition process, besides, formable patterns are limited. It is hence difficult to apply this process to a TFT color liquid crystal display device in the existing technique. Further, the printing process involves a drawback that resolution is poor, and is hence unfit to form fine-pitch patterns.

In order to eliminate these drawbacks, Japanese Patent Application Laid-Open Nos. 59-75205, 63-235901 and 1-217302 each have proposed a process for producing a color filter using an ink-jet system. However, these proposals are not yet satisfactory.

SUMMARY OF THE INVENTION

It is accordingly an object of the present invention to provide a production process of a color filter, which satisfies both required properties met by the conventional processes, such as heat resistance, solvent resistance and resolution, and ink-jet recordability, and moreover permits the shortening of processes to reduce its cost, and a color filter produced by this process and having high reliability, and particularly to provide a color filter for liquid crystal display device, which is high in reliability in that color irregularity and blank areas are prevented even with inks in small amounts upon arrangement of colorants by ejection of inks using an ink-jet system, and surface smoothness becomes excellent.

Another object of the present invention is to provide a color filter excellent in heat resistance and solvent resistance, in which color mixing, color irregularity and blank areas are prevented.

A further object of the present invention is to provided a liquid crystal display panel equipped with such a color filter and an information processor equipped with this liquid crystal display panel.

The above objects can be achieved by the present invention described below.

According to the present invention, there is thus provided a color filter comprising a base equipped with light-transmitting areas, and an ink-receiving layer provided on the base and equipped with colored light-transmitting areas on the light-transmitting areas of the base, wherein the ink-receiving layer comprises a homopolymer of a monomer having a structural unit represented by the formula:

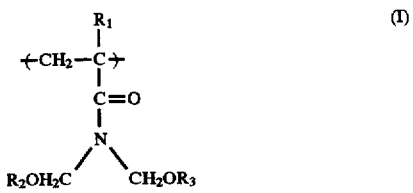

wherein $R_1$ denotes hydrogen or a methyl group, and $R_2$ and $R_3$ are, independently of each other, hydrogen or an alkyl group having 1 to 5 carbon atoms, or its copolymer with one or more other vinyl monomers.

According to the present invention, there is also provided a process for producing a color filter by arranging colorants on a base by an ink-jet system, which comprises the steps of:

(1) providing an ink-receiving layer on the base; and
(2) applying droplets of inks to the ink-receiving layer by the ink-jet system to color the ink-receiving layer, wherein the ink-receiving layer comprises a homopolymer of a monomer having a structural unit represented by the formula:

wherein $R_1$ denotes hydrogen or a methyl group, and $R_2$ and $R_3$ are, independently of each other, hydrogen or an alkyl group having 1 to 5 carbon atoms, or its copolymer with one or more other vinyl monomers.

According to the present invention, there is further provided a process for producing a color filter by arranging colorants on a base by an ink-jet system, which comprises the steps of:

(1) providing an ink-receiving layer containing a composition having good water-based ink absorptivity, the ink absorptivity of which is lowered at its treated portions by light irradiation or light irradiation and a heat treatment, on the base;

(2) subjecting a part of the ink-receiving layer to light irradiation or light irradiation and a heat treatment to partly lower the ink absorptivity of the ink-receiving layer; and (3) applying droplets of inks to untreated portions of the ink-receiving layer by the ink-jet system to color the untreated portions, wherein the ink-receiving layer comprises (a) a homopolymer of a monomer having a structural unit represented by the formula:

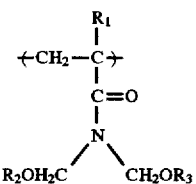

(I)

wherein $R_1$ denotes hydrogen or a methyl group, and $R_2$ and $R_3$ are, independently of each other, hydrogen or an alkyl group having 1 to 5 carbon atoms, or its copolymer with one or more other vinyl monomers, and (b) a photo-induced initiator.

According to the present invention, there is still further provided a color filter produced by any one of the production processes described above.

According to the present invention, there is yet still further provided a liquid crystal display panel comprising the color filter described above, a base provided in an opposing relation with the color filter and a liquid crystal composition enclosed in a space between the color filter and the base.

According to the present invention, there is yet still further provided a liquid crystal display panel comprising the color filter described above, a base provided in an opposing relation with the color filter and equipped with light-screening areas, and a liquid crystal composition enclosed in a space between the color filter and the base.

According to the present invention, there is yet still further provided an information processor equipped with any one of the liquid crystal display panels described above.

BRIEF DESCRIPTION OF THE DRAWINGS

FIG. 11 is a block diagram illustrating a construction of a production controller in the production apparatus of FIG. 10.

DESCRIPTION OF THE PREFERRED EMBODIMENTS

The preferred embodiments of the present invention will hereinafter be described in detail by reference to the drawings.

FIGS. 1A through 1E illustrate a production process of a color filter for liquid crystal display device according to the present invention and show an exemplary construction of the color filter for liquid crystal display device according to the present invention.

In the present invention, a glass base is generally used as a base. However, the base is not limited to the glass base so far as it has properties required of the color filter for liquid crystal display device, such as transparency and mechanical strength.

Figure 1A:
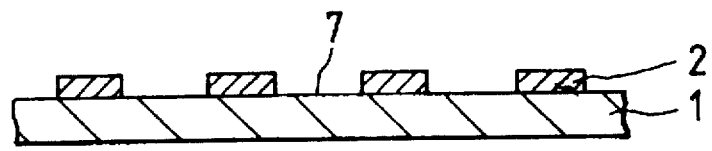
FIGS. 1A through 1E illustrate a production process of a color filter according to an embodiment of the present invention.
Figure 1B:
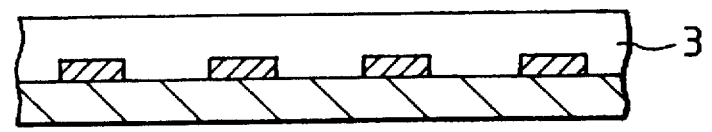

FIG. 1A illustrates a glass base 1 on which black matrices as light-screening areas 2 have been formed. In FIG. 1A, reference numeral 7 indicates a light-transmitting area or an aperture defined by the black matrices or pixel. A composition containing a polymer composed of structural units represented by the formula (I), which will be described subsequently, and used in the present invention is first applied onto the base on which the black matrices have been formed, and is prebaked, as needed, to form an ink-receiving layer 3 (FIG. 1B).

A material for forming the black matrices may be either a metal or a resin.

Any of homopolymers of monomers has a structural unit represented by the formula (I)

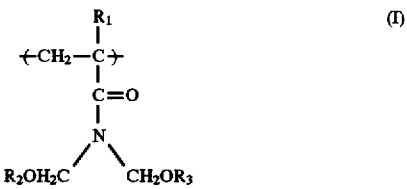

(I)

wherein $R_1$ denotes hydrogen or a methyl group, and $R_2$ and $R_3$ are, independently of each other, hydrogen or an alkyl group having 1 to 5 carbon atoms, or its copolymer with one or more other vinyl monomers.

Specific examples of the monomers composed of the structural unit represented by the formula (I) include N,N-dimethylolacrylamide, N,N-dimethoxymethylacrylamide, N,N-diethoxymethylacrylamide, N,N-dimethylolmethacrylamide, N,N-dimethoxymethylmethacrylamide and N,N- diethoxymethylmethacrylamide, to which, however, are not limited. These monomers are singly polymerized or copolymerized with one or more other vinyl monomers. These monomers are dealt as hydrophilic monomers.

Examples of the other vinyl monomers as hydrophilic monomers include carboxyl group-containing vinyl monomers such as acrylic acid and methacrylic acid, hydroxyl group-containing vinyl monomers such as hydroxymethyl methacrylate, hydroxyethyl methacrylate, hydroxymethyl acrylate and hydroxyethyl acrylate, and besides acrylamide, methacrylamide, acrylonitrile, allylamine and vinylamine. However, it goes without saying that such monomers are not limited these monomers.

The content of the monomer of the formula (I) as the hydrophilic monomer in the polymer is from 5 to 100% by weight, particularly preferably from 10 to 100% by weight.

Examples of the other vinyl monomers as hydrophobic monomers include acrylic esters such as methyl acrylate and ethyl acrylate, methacrylic esters such as methyl methacrylate and ethyl methacrylate, styrene, α-methylstyrene, vinyl acetate and vinyl propionate. However, it goes without saying that such monomers are not limited these monomers.

Since such a polymer is excellent in affinity for inks, the inks become liable to uniformly spread over the ink-receiving layer even when the inks are applied in small amounts onto the ink-receiving layer, and so color irregularity and blank areas can be prevented. Such a polymer is also excellent in heat resistance and solvent resistance, so that an ITO film can be uniformly formed on the ink-receiving layer formed with this polymer. In addition, black matrices may also be formed on the ink-receiving layer.

When the inks are applied in small amounts, swelling of the ink-receiving layer applied with the inks can be prevented, and so the surface smoothness of the ink-receiving layer applied with the inks becomes good.

As described below, it is important to set a part of the ink-receiving layer prior to the application of the inks if there is a possibility that color mixing may occur between adjacent inks of different colors, for example, in the case where amounts of the inks to be applied will be increased.

Even in such a case, the use of such a polymer makes a marked difference in ink absorptivity between set portions and unset portions of the ink-receiving layer, and can hence prevent color mixing between inks of different colors.

The weight average molecular weight of these polymers is preferably within a range of from $10^2$ to $10^7$.

The content of the hydrophilic monomers including the monomer composed of the structural unit of the formula (I) in the copolymer is preferably from 5 to 95% by weight, more preferably from 7 to 90% by weight, most preferably from 10 to 85% by weight.

A coating process such as spin coating, roll coating, bar coating, spray coating or dip coating may be used for forming this ink-receiving layer.

Figure 1C:
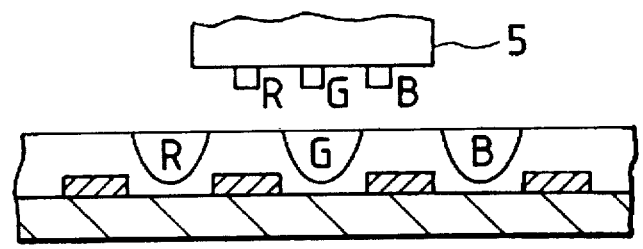
Figure 1D:
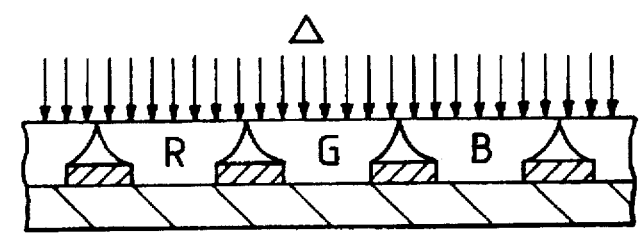

Using an ink-jet head 5, inks of R, G and B colors are then applied into the Apertures (pixels) and dried as needed (FIG. 1C).

Figure 1E:
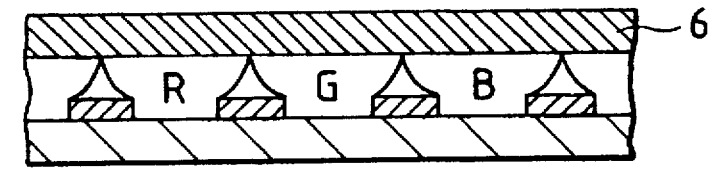

The colored ink-receiving layer is subjected to a heat treatment to set it (FIG. 1D), and a protective layer is formed thereon, as needed, thereby producing a color filter (FIG. 1E).

FIGS. 2A through 2F illustrate a production process according to another embodiment of the present invention, in which partition walls are formed to prevent color mixing between pixels.

In this embodiment, a composition having good water-based ink absorptivity, the ink absorptivity of which is lowered at its treated portions by light irradiation or light irradiation and a heat treatment, is used as a composition for forming an ink-receiving layer.

As such a composition, there is used a combination of the polymer comprising the monomer represented by the formula (I) with a photo-induced initiator.

As the photo-induced initiator, there may be preferably used halogenated triazine compounds, diphenyliodonium salt derivatives and triphenylsulfonium salt derivatives.

As the halogenated triazine compounds, are preferred compounds in which trihalomethyl groups have been introduced in a triazine ring as represented by the general formula

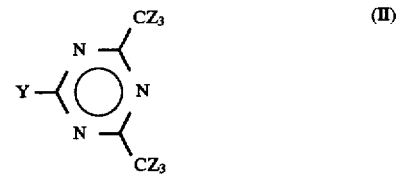

wherein Z is halogen, and Y is $CZ_3$ (Z is halogen), phenyl, halogenated phenyl,

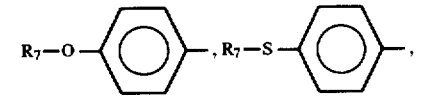

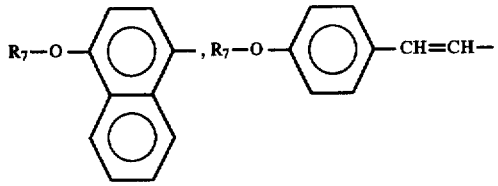

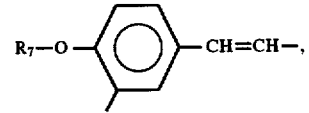

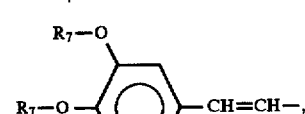

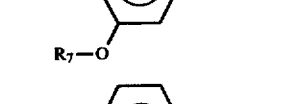

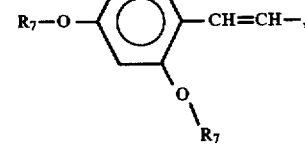

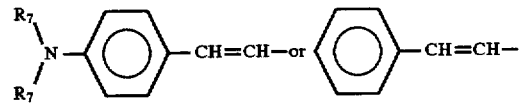

in which $R_7$ is an alkyl group having 1 to 5 carbon atoms, with the proviso that if two or more $R_7$ groups exist in a group, they may be different from each other. Specific examples thereof include 2-(p-methoxyphenyl)-4,6-bis-(trichloromethyl)-s-triazine, 2-styryl-4,6-bis(trichloromethyl)-s-triazine, 2-(p-methoxystyryl)-4,6-bis(trichloromethyl)-s-triazine and 2-phenyl-4,6-bis(trichloromethyl)-s-triazine.

As the diphenyliodonium salt derivatives, are preferred compounds represented by the general formula

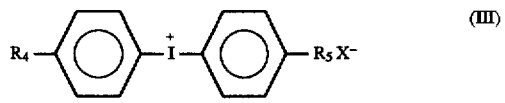

$R_4$ and $R_5$ are, independently of each other, hydrogen, an alkoxyl group having 1 to 5 carbon atoms or a t-butyl group, and $X^-$ is $BF_4^-$, $PF_6^{-1}$, $SbF_6^-$ or $CF_3SO_3^-$. Specific examples thereof include diphenyliodonium hexafluoroantimonate, diphenyliodonium tetrafluoroborate, diphenyliodonium hexafluorophosphate, diphenyliodonium triflate and derivative thereof. However, it goes without saying that the iodonium salt derivatives are not limited to these compounds.

As the triphenylsulfonium salt derivatives, are preferred compounds represented by the general formula

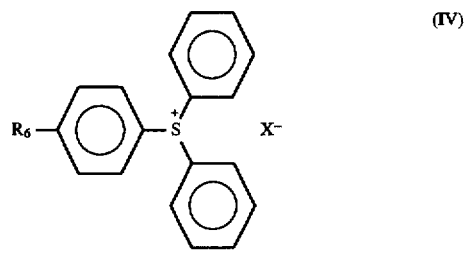

wherein $R_6$ is hydrogen, an alkoxyl group having 1 to 5 carbon atoms, an alkyl group having 1 to 5 carbon atoms,

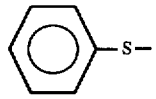

or fluorine, and $X^-$ has the same meaning as defined above. Specific examples thereof include triphenylsulfonium hexafluoroantimonate, triphenylsulfonium tetrafluoroborate, triphenylsulfonium hexafluorophosphate, triphenylsulfonium triflate and derivative thereof. However, it goes without saying that the sulfonium salt derivatives are not limited to these compounds.

The photo-induced initiator (b) is contained in a proportion of from 0.01 to 10 parts by weight, preferably from 0.01 to 5 parts by weight per 100 parts by weight of the polymer (a).

A compound such as perylene, anthracene or phenothiazine may be added as a sensitizer in the composition.

Figure 2A:
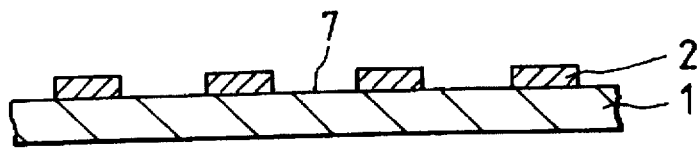
FIGS. 2A through 2F illustrate a production process of a color filter according to another embodiment of the present invention.
Figure 2B:
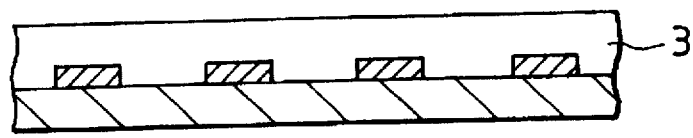

As illustrated in FIG. 2B, the above composition is applied onto the base, and prebaked, as needed, thereby forming the ink-receiving layer 3.

Figure 2C:
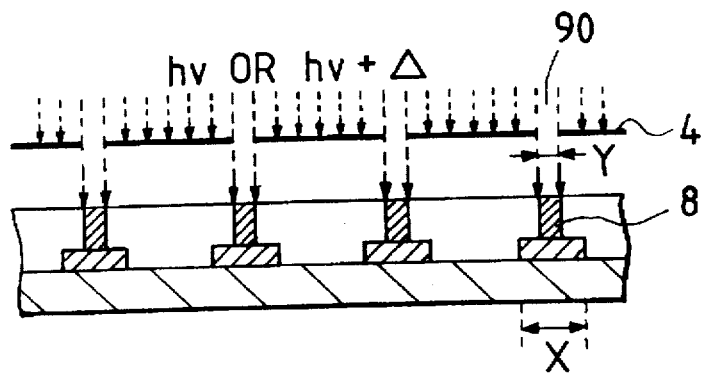
Figure 2D:
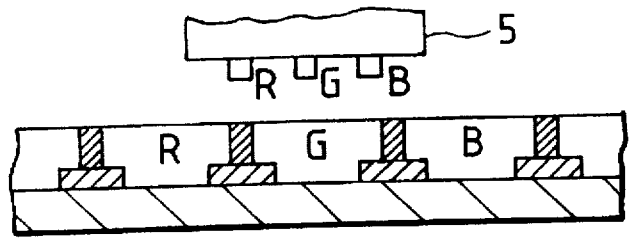
Figure 2E:
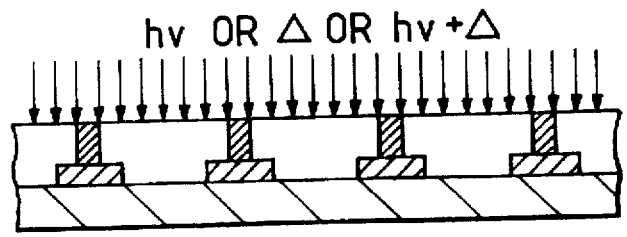
Figure 2F:
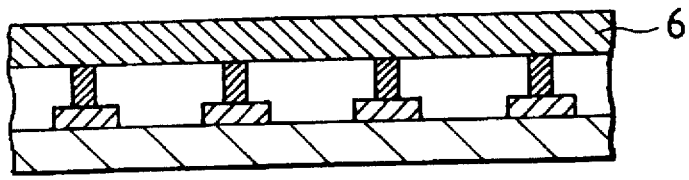

The ink-receiving layer 3 is then subjected to patterning exposure at portions of the black matrices 2, which are light-screening areas, using a photomask 4, to lower the ink absorptivity of the ink-receiving layer 3 at the light-exposed portions (FIG. 2C). Thereafter, unexposed portions of the ink-receiving layer are colored with R, G and B color inks using an ink-jet head 5 (FIG. 2D). The inks applied are dried as needed. The portions (set portions) of the ink-receiving layer, at which the ink absorptivity has been lowered, function as partition walls and hence prevent color mixing of inks of different colors.

In order to prevent the occurrence of blank areas of the color filter, it is preferable to color wider areas than apertures defined by the black matrices 2 and hence to use a mask having openings narrower than the light-screening width of the black matrix.

As the photomask 4 used upon the patterning exposure, there is used a photomask having openings 90 for lowering the ink absorptivity of the ink-receiving layer 3 at partition wall-forming portions 8 substantially corresponding to the black matrices 2. In view of the need of ejecting an ink in a rather great amount to prevent the occurrence of blank areas at a portion adjoining the black matrix 2, at this time, it is preferable to use a mask having an opening width Y narrower than the width X of the black matrix 2. This makes it possible to narrow the width of the partition wall 8 to be formed as compared with the width of the black matrix 2. Specifically, a ratio of Y to X is preferably from 0.05 to 0.95, particularly from 0.1 to 0.9.

Figure 3A:
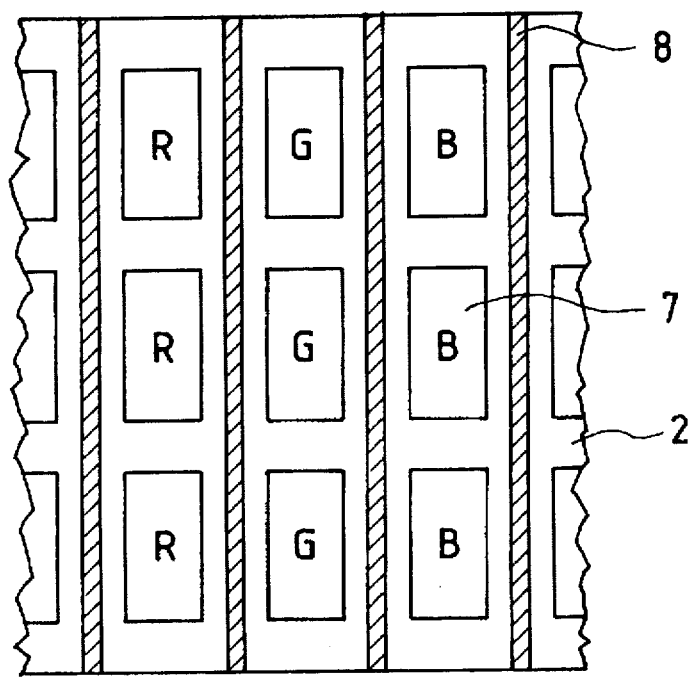
FIGS. 3A and 3B are plan views of color filters.
Figure 3B:
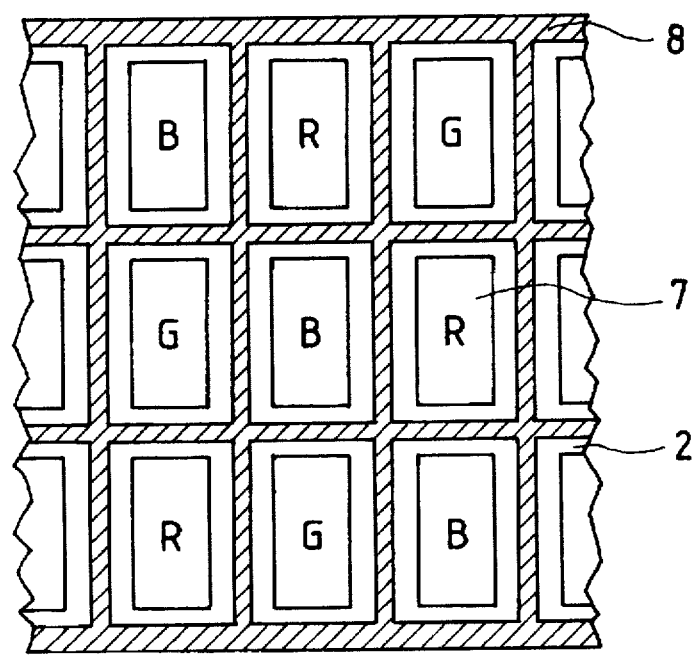

FIGS. 3A and 3B illustrate plan views of the color filters according to the present invention in which patterning exposure is performed in the stripe form and in the matrix form, respectively.

The patterning exposure may be performed either in the stripe form as illustrated in FIG. 3A or in the matrix form as illustrated in FIG. 3B. The patterning exposure in the stripe form is suitable for the production of a color filter having a stripe-like colored pattern, while the patterning exposure in the matrix form is suitable for the production of a color filter having a matrix-like colored pattern.

FIGS. 4A to 4F illustrate a production process of a color filter used in a liquid crystal display panel in which black matrices are provided on a base opposite to a color filter base.

A process in which the black matrices are provided on the opposite base, not on the side of the color filter, is useful as a method of improving aperture efficiency.

Figure 4A:
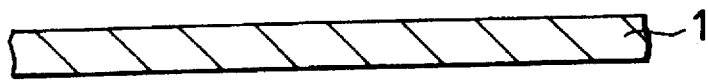
FIGS. 4A through 4F illustrate a production process of a color filter according to a further embodiment of the present invention.
Figure 4B:
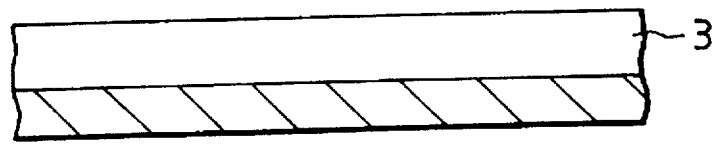

A composition, the ink absorptivity of which is lowered at its light-exposed portions by light irradiation or light irradiation and a heat treatment, is applied onto a glass base 1 illustrated in FIG. 4A, and is prebaked, as needed, to form an ink-receiving layer 3 the ink absorptivity of which is lowered at its light-exposed portions by light irradiation or light irradiation and a heat treatment (FIG. 4B).

Figure 4C:
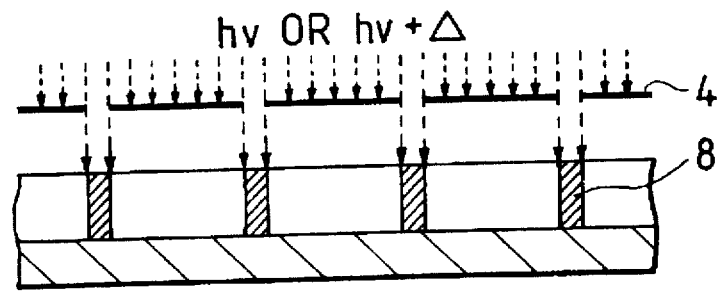
Figure 4D:
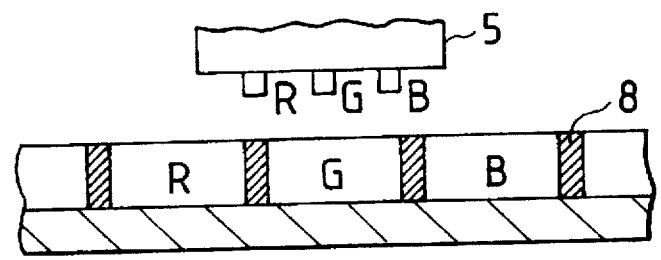
Figure 4E:
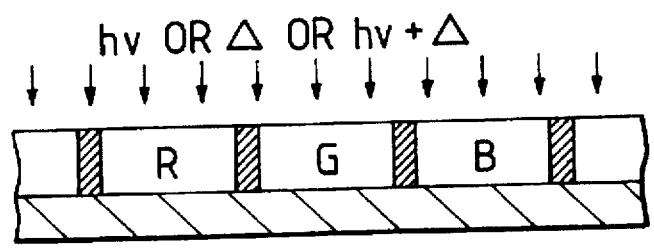
Figure 4F:
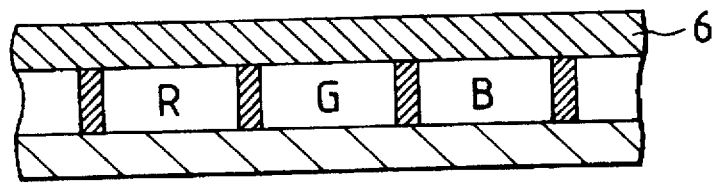

Patterning exposure is then conducted using a photomask 4, thereby lowering the ink absorptivity of the ink-receiving layer 3 at the light-exposed portions (FIG. 4C). Thereafter, the unexposed portions of the ink-receiving layer 3 are colored with individual color inks of R, G and B using an ink-jet head 5 (FIG. 4D). The inks applied are dried as needed. In order to prevent the occurrence of blank areas, it is important to make the width of each partition wall 8 narrower than that of the black matrix (not shown) provided on the opposite base.

As the inks used in the coloring, there may be used both dye inks and pigment inks. Both liquid inks and solid inks may also be used.

As the ink-jet system, a bubble-jet type making use of an electrothermal converter as an energy-generating element, a piezo-jet type making use of a piezoelectric element or the like may be used. A coloring portion and a coloring pattern may be optionally preset. The black matrices may be formed on an ink-receiving layer, the ink absorptivity of which is lowered at its light-exposed portions by light irradiation or light irradiation and a heat treatment, after the formation of the ink-receiving layer or after coloring without any particular problem. The form thereof is not limited to this embodiment. As a method of forming the black matrices, it is common to form a metal film on the base by sputtering or vapour deposition, and pattern this film by a photolithographic process, or to pattern a black photosensitive resin, to which, however, is not limited.

The colored ink-receiving layer is then subjected to light irradiation and/or a heat treatment to set it (FIGS. 2E or 4E), and a protective layer 6 is formed on the ink-receiving layer as needed (FIGS. 2F or 4F) to obtain a color filter. As the protective layer, may be used a resin material of the photosetting type, thermosetting type or light- and heat-setting type, or an inorganic film formed by vapour deposition, sputtering or the like. Any material may be used so far as it has sufficient transparency to be used in a color filter and withstands subsequent ITO-forming process, orientation film-forming process and the like.

Figure 5:
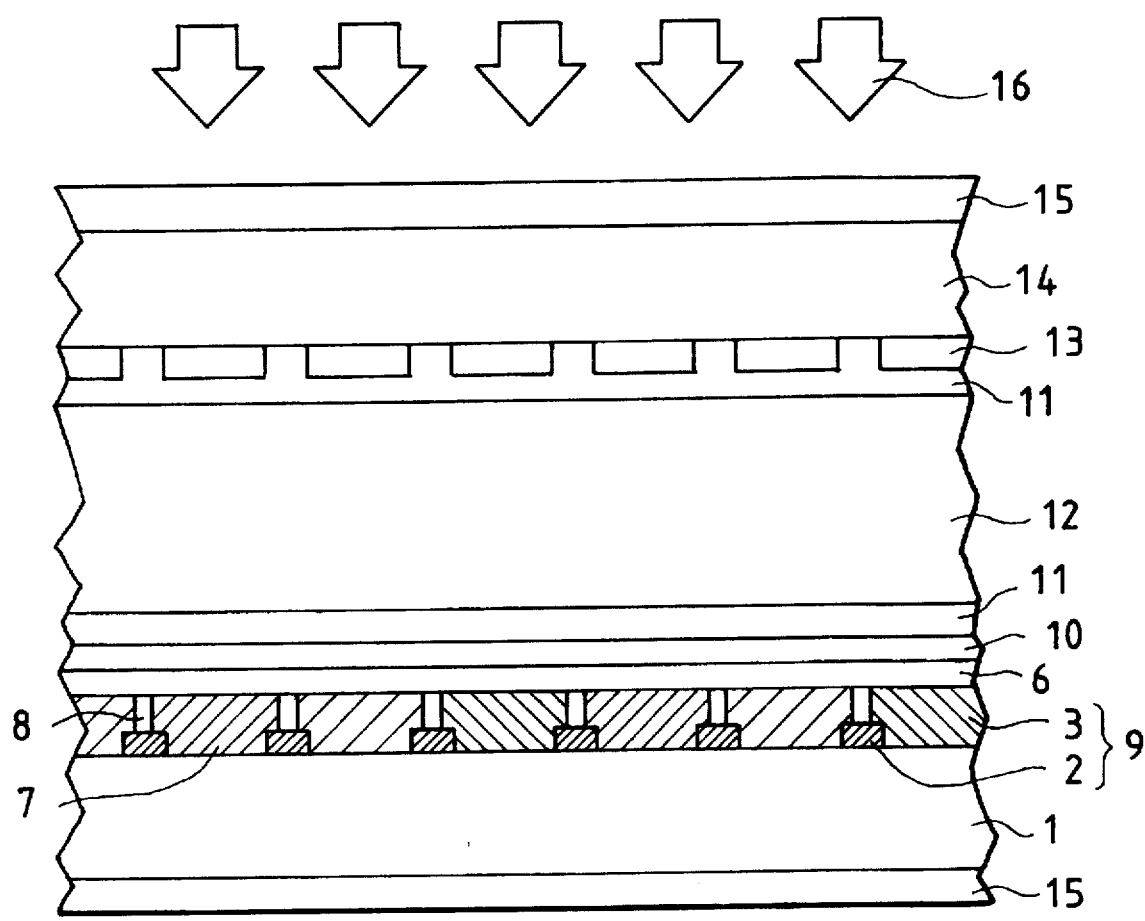
FIG. 5 is a cross-sectional view of a liquid crystal display panel according to an embodiment of the present invention.
Figure 6:
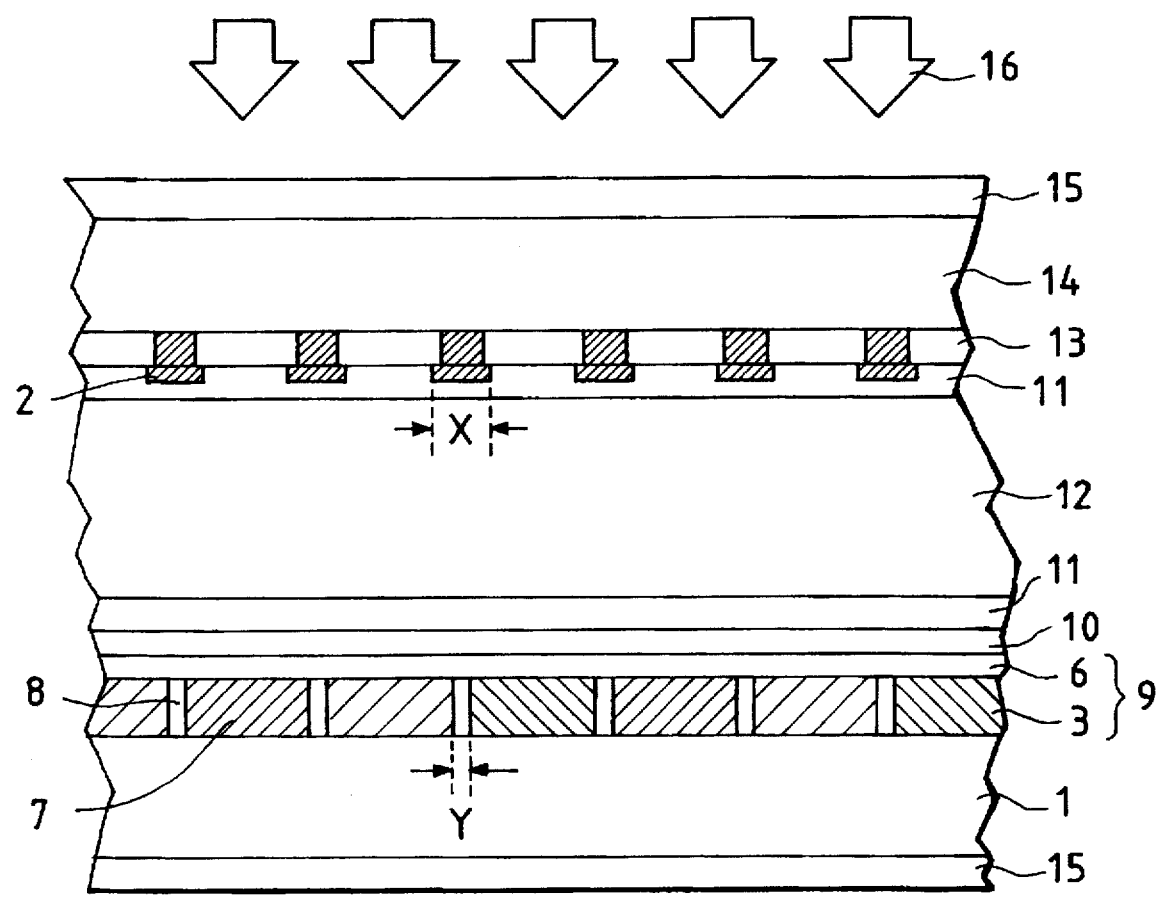
FIG. 6 is a cross-sectional view of a liquid crystal display panel according to another embodiment of the present invention.

FIGS. 5 and 6 illustrates cross sections of TFT color liquid crystal display panels in which the color filter according to the present invention has been incorporated. The form thereof is not limited to these embodiments.

A color liquid crystal display panel is generally formed by uniting a color filter base 1 and a base 14 opposite to the color filter base 1 and charging a liquid crystal compound 12 in a space between them. TFT (not illustrated) and transparent pixel electrodes 13 are formed in the form of a matrix inside one base 14 of the liquid crystal display panel. A color filter 9 is disposed so as to arrange coloring matters of R, G and B colors at positions opposite to the pixel electrodes 13 inside the other base 1. A transparent counter (or common) electrode 10 is formed over on the color filter 9. Black matrices are generally formed on the side of the color filter base (FIG. 5), but formed on the side of the opposite TFT base in a liquid crystal display panel of the BM on Array type (FIG. 6). Orientation films 11 are further formed within the surfaces of both bases. Liquid crystal molecules can be oriented in a fixed direction by subjecting these films to a rubbing treatment. Polarizing plates 15 are bonded to the outer surfaces of both glass bases. The liquid crystal compound 12 is charged in a space (about 2 to 5 µm) between these glass bases. As a back light 16, a combination of a fluorescent lamp and a scattering plate (both, not shown) is generally used. The liquid crystal compound functions as a shutter for changing the transmittance of rays from the back light, thereby making a display. Reference numerals 3, 6, 7 and 8 have the same meaning as in FIGS. 2A to 2F.

An embodiment in which such a liquid crystal display panel is applied to an information processor will be described by reference to FIGS. 7 through 9.

Figure 7:
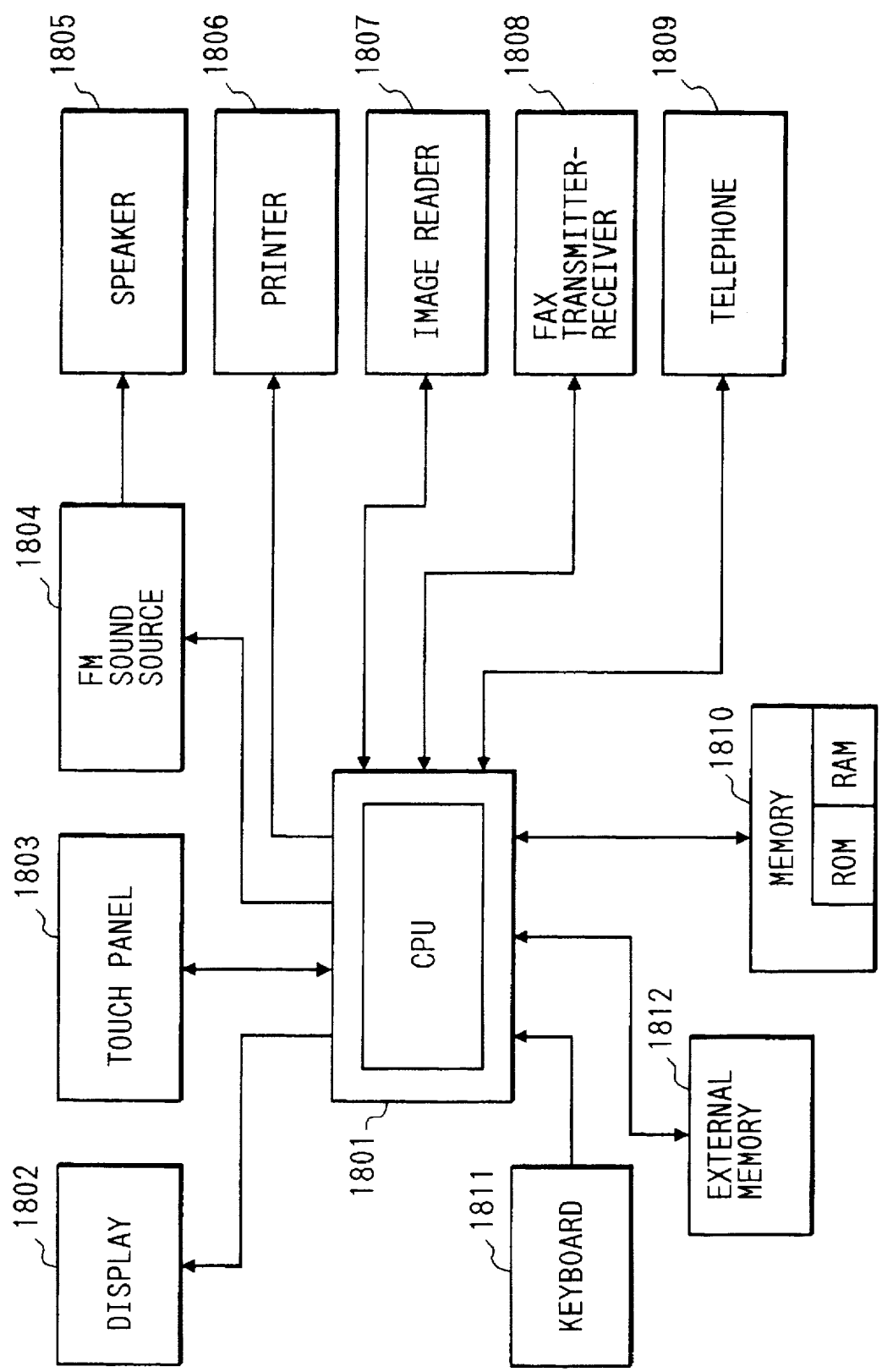
FIG. 7 is a block diagram illustrating a construction in which a liquid crystal display panel according to the present invention is applied to an information processor.

FIG. 7 is a block diagram illustrating a schematic construction of a case where the liquid crystal display panel is applied to an information processor having functions as "Word Processor, Personal Computer, Facsimile Terminal Equipment and Copying Machine".

In FIG. 7, reference numeral 1801 designates a control section serving to control the whole apparatus. The control section 1801 is equipped with a CPU such as a microprocessor, and various I/O ports, and outputs control signals, data signals and the like into individual units and inputs control signals and data signals from the individual units, thereby making control. Reference numeral 1802 indicates a display section. Various menus, document information, image data read by an image reader 1807, etc. are displayed on its display screen. Reference numeral 1803 designates a transparent touch panel of the pressure sensing type, which is provided over the display 1802. Item input, coordinate position input and the like can be performed on the display 1802 by pressing the surface of the touch panel 1803 with fingers or the like.

Reference numeral 1804 indicates an FM (frequency modulation) sound source section in which music information prepared by a music editor or the like is stored as digital data in a memory section 1810 and an external memory 1812 and read from these memories to conduct FM modulation. Electric signals from the FM sound source section 1804 are converted into audio sounds by a speaker section 1805. A printer section 1806 is used as an output terminal for a word processor, personal computer, facsimile terminal equipment and copying machine.

Reference numeral 1807 indicates an image reader section serving to photoelectrically read original data and to input them. The image reader section 1807 is provided in the course of the conveyance of an original and serves to read a facsimile information, copied materials and other various original documents.

Reference numeral 1808 designates a transmitter-receiver section of the facsimile (FAX), which effects facsimile transmission of the original document data read by the image reader 1807 and receives facsimile signals sent to decode them. The transmitter-receiver has a function of external interface. Reference numeral 1809 designates a telephone section having various telephone functions such as an ordinary telephone function and an automatic telephone answering function.

Reference numeral 1810 indicates the memory section containing application programs such as a system program and a manager program, a ROM, which stores character fonts, a dictionary, etc., application programs and document information loaded from the external memory 1812, a video RAM, etc.

Reference numeral 1811 designates a keyboard section serving to input document information, various commands and the like.

Reference numeral 1812 designates the external memory which uses, as storage media, floppy disks and hard disks. In this external memory 1812, document information, music or audio information, application programs for users, etc. are stored.

Figure 8:
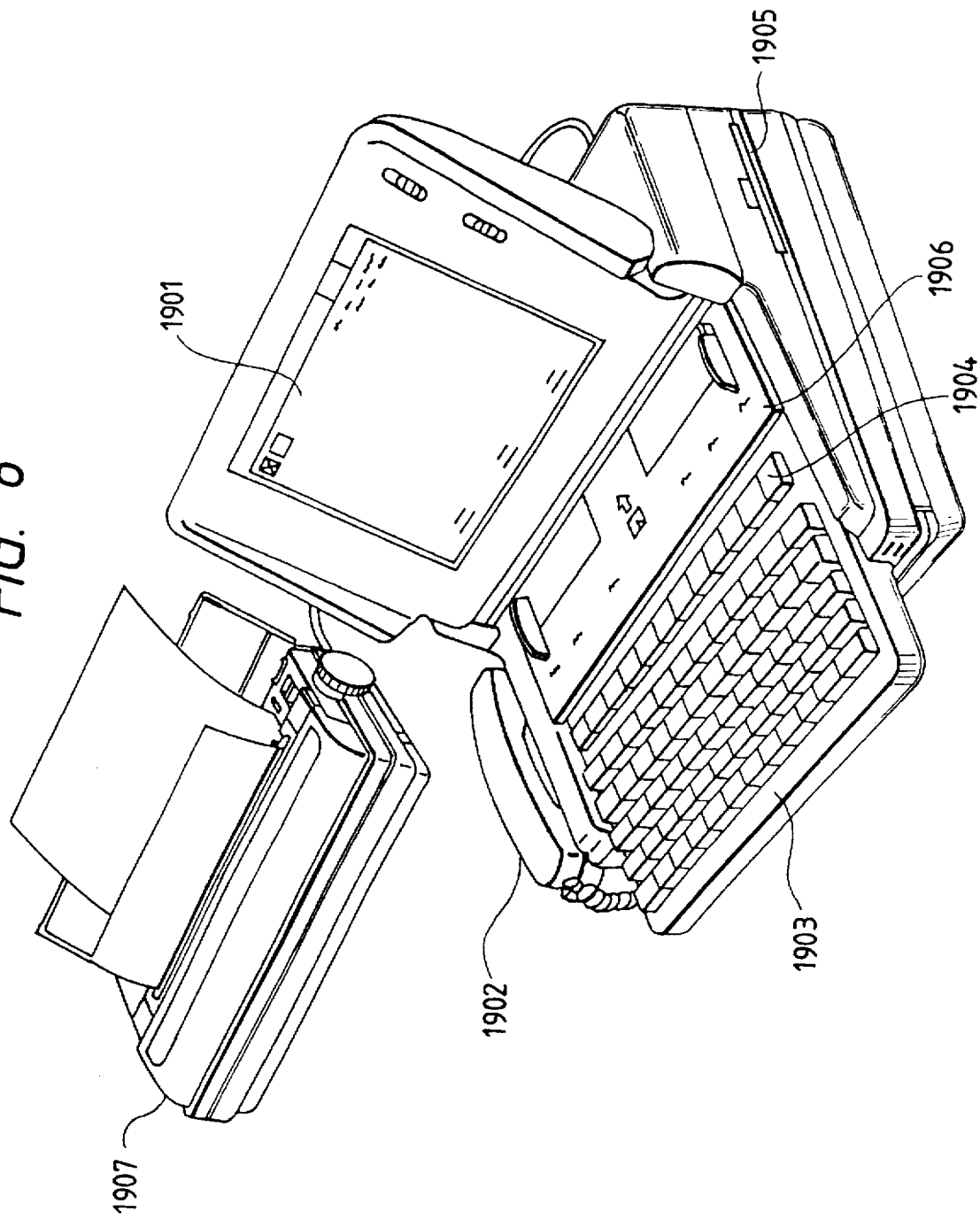
FIG. 8 is a typical bird's-eye view of the information processor of FIG. 7.

FIG. 8 is a typical bird's-eye view of the information processor of FIG. 7.

In FIG. 8, reference numeral 1901 indicates a flat panel display making good use of the above-described liquid crystal display panel and serving to display various menus, graphic information, document information and the like. Coordinate input, item-specifying input and the like can be performed by pressing the surface of the touch panel 1803 over the display 1901 with fingers or the like. Reference numeral 1902 designates a hand set used at the time the processor functions as a telephone. A keyboard 1903 is detachably connected to a main body through a code and serves to effect input of various document functions and various data. Various function keys 1904 and the like are provided in this keyboard 1903. Reference numeral 1905 indicates an insertion opening for a floppy disk into the external memory 1812.

Reference numeral 1906 designates a paper plate on which an original document to be read by the image reader section 1807 is placed. The original document read is discharged from the rear of the processor. Facsimile information or the like received is printed by an ink-jet printer 1907.

When the information processor functions as a personal computer or ward processor, various kinds of information inputted from the keyboard section 1811 are processed in the control section 1801 in accordance with the predetermined program and outputted as images to the printer section 1806.

When the information processor functions as a receiver for a facsimile terminal equipment, facsimile information inputted from the transmitter-receiver section 1808 Of the FAX through a telecommunication line is processed for receiving in the control section 1801 in accordance with the predetermined program and outputted as received images to the printer section 1806.

When the information processor functions as a copying machine, an original document is read by the image reader section 1807, and the thus-read original document data are outputted as copy images to the printer section 1806 through the control section 1801. When the information processor functions as a transmitter for a facsimile terminal equipment, original date read by the image reader section 1807 is processed for transmission in the control section 1801 in accordance with the predetermined program and then transmitted to a telecommunication line through the transmitter-receiver section 1808 of the FAX.

Figure 9:
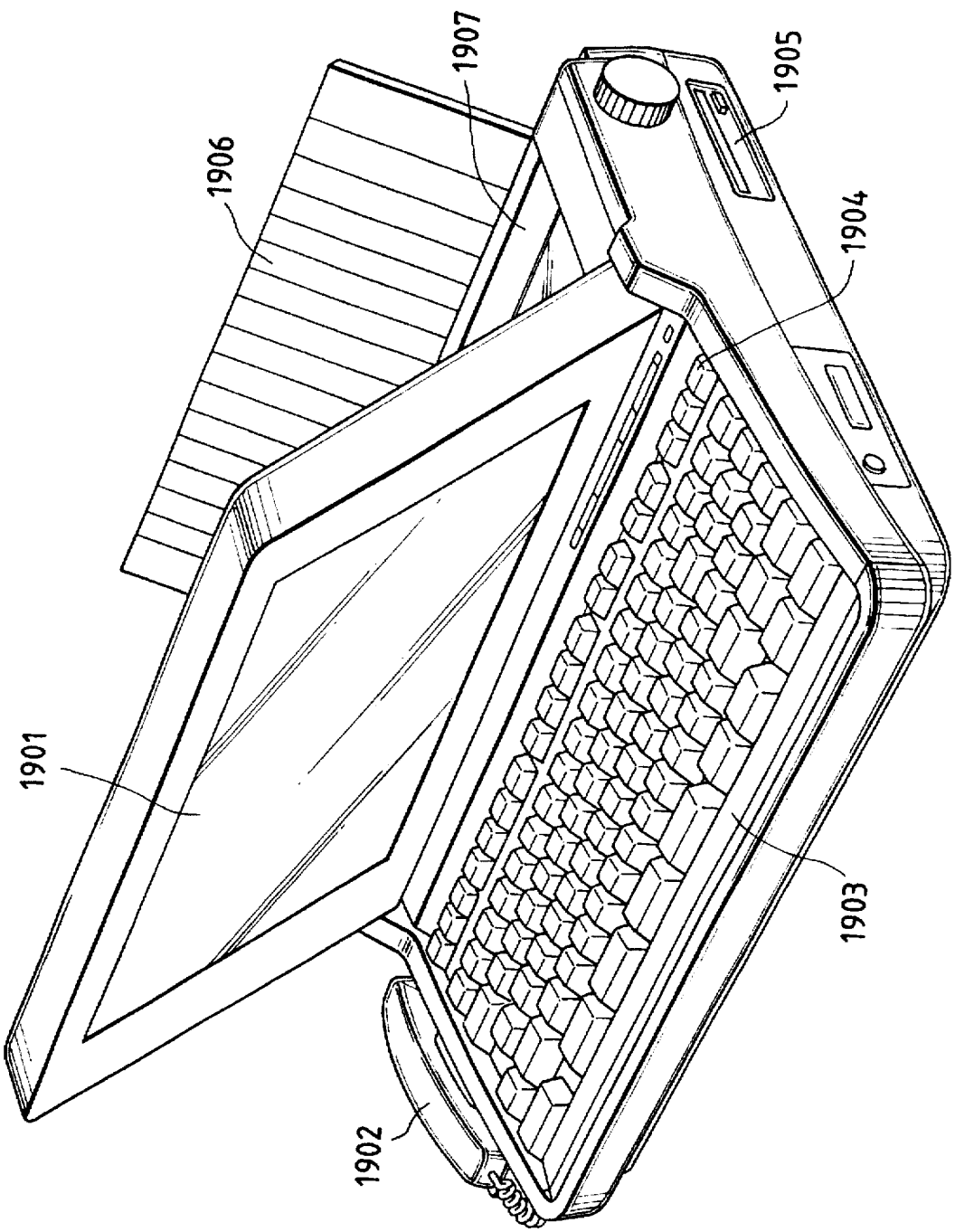
FIG. 9 is a typical drawing illustrating an exemplary information processor.

The information processor may be an integrated apparatus in which an ink-jet printer is built in the main body as illustrated in FIG. 9. In this case, portability may be more enhanced. In FIG. 9, like reference numerals are given to parts having the same function as those in FIG. 8.

Figure 10:
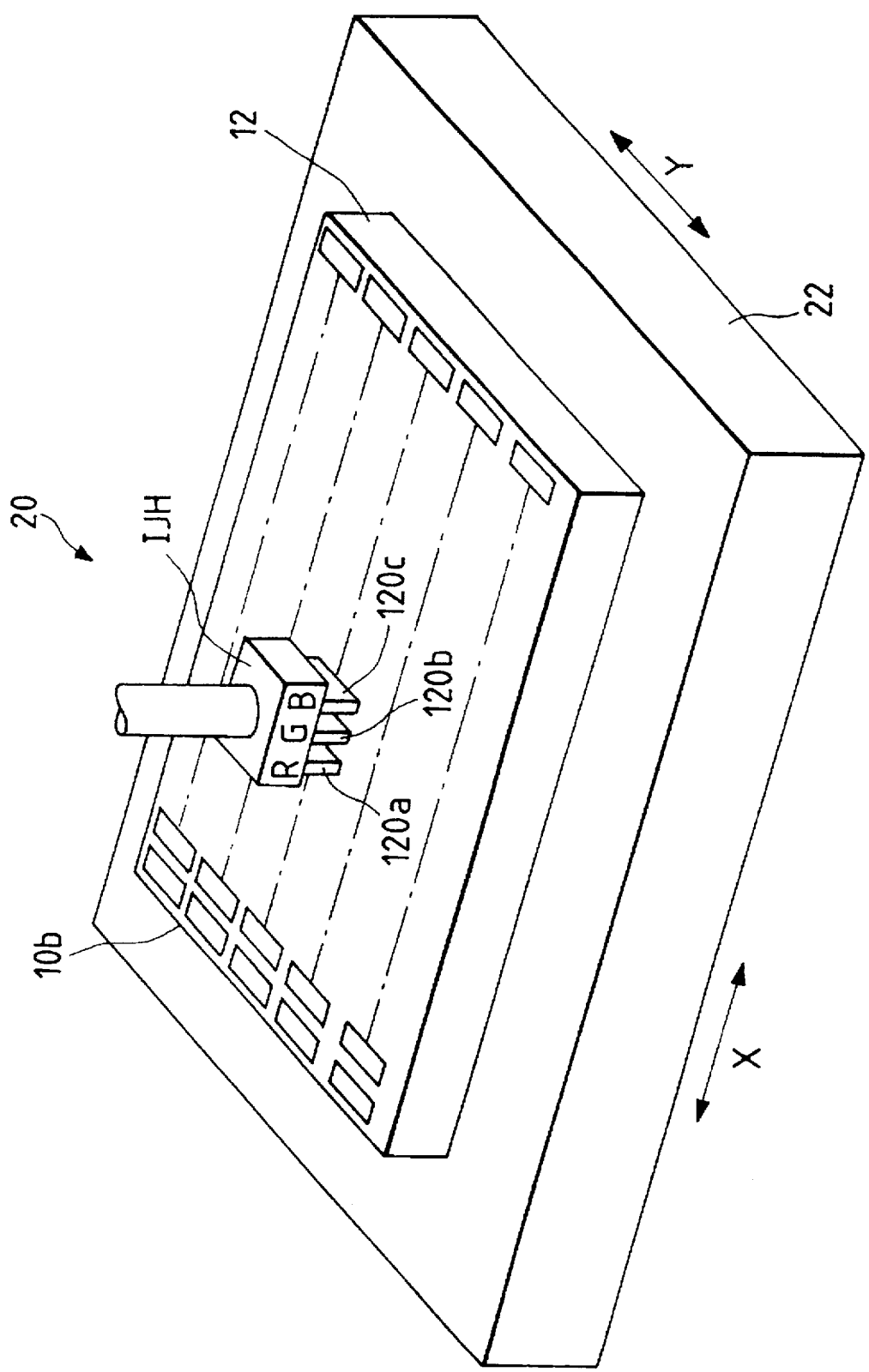
FIG. 10 illustrates a construction of a production apparatus for producing a color filter.

FIG. 10 illustrates a construction of a production apparatus for producing the color filters shown in FIGS. 2 and 4.

In FIG. 10, the production apparatus 20 is placed on a frame not illustrated and is equipped with an XY table 22 movable in X and Y directions in the drawing and an ink-jet head IJH fixed to the frame via a support member (not illustrated) over the XY table 22. On the XY table 22, is placed a glass base 12 on which light-screening lattices (black matrices) 10b and portions to be colored have been formed. The ink-jet head IJH is equipped with a head 120a for red ink, which ejects a red ink, a head 120b for green ink, which ejects a green ink, and a head 120c for blue ink, which ejects a blue ink. These heads 120a, 120b and 120c are constructed so as to be able to independently eject their corresponding inks.

In the production apparatus 20 thus constructed, an ink of R, G or B color is ejected within the frame of the desired light-screening lattice 10b on the glass base 12 while the XY table 22 is moved in the XY directions to the ink-jet head IJH, thereby coloring the glass base within the individual frames of the light-screening lattices 10b to complete a color filter.

FIG. 11 is a block diagram illustrating a construction of a production controller in the production apparatus 20 of FIG. 10.

In FIG. 11, reference numeral 31 designates a teaching pendant which is an input-output means of the production controller, 32 a display section which displays results of ejection information and the like, and 33 a setting section in which ejection conditions such as an ejection pattern are set, respectively.

Reference numeral 34 indicates a controller which controls the production apparatus 20 for the color filter, 35 an interface serving to transfer data to the teaching pendant 31, 36 a CPU serving to conduct the stage control and operation of track planning of the production apparatus 20, 37 a ROM which stores a control program for operating the CPU, 38 a RAM which stores data such as ejection conditions, and 40 an ejection control section serving to control the ejection patterns of colorants, which is a particularly important part in this embodiment. The ejection control section is constructed by an ejection-timing control section 43 which controls the ejection-starting position, ejection interval and ejection number in a filter element, and an ejection-quantity control section 44 which controls the size of a dot in the filter element. Reference numeral 41 designates a control section for the stage 22 of the production apparatus 20. Reference numeral 20 indicates the production apparatus which is connected to the controller 34 and operates on the instruction thereof.

The present invention will hereinafter be described more specifically by the following Examples. However, the present invention is not limited to these examples only.

EXAMPLE 1

A resin composition comprising a terpolymer (compositional ratio of monomers=25:30:45, molecular weight: Ca. 8,000) of N,N-dimethylolacrylamide, methyl methacrylate and hydroxyethyl methacrylate was applied by spin coating onto a glass base on which black matrices 2 had been formed as illustrated in FIG. 1A, so as to give a coating thickness of 1 μm, and prebaked at 70° C. for 10 minutes, thereby forming an ink-receiving layer 3.

Using an ink-jet head 5, the ink-receiving layer was then colored on a matrix pattern with dye inks of R, G and B colors. The inks thus applied were then dried at 90° C. for 5 minutes. The ink-receiving layer was subsequently subjected to a heat treatment at 200° C. for 60 minutes to set it, thereby producing a color filter according to the present invention.

The color filter for liquid crystal display device thus produced was observed through a light microscope. As a result, defects such as color irregularity and blank areas were not observed.

EXAMPLE 2

A resin composition comprising 10 parts by weight of (a) the same terpolymer as that used in Example 1 and 0.5 part by weight of (b) a halogenated triazine compound (trade name: TAZ-10, product of Midori Kagaku K.K.) having the following structure

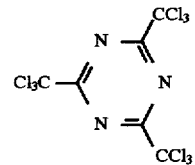

was applied by spin coating onto a glass base on which black matrices 2 had been formed as illustrated in FIG. 2A, so as to give a coating thickness of 1 μm, and prebaked at 70° C. for 10 minutes, thereby forming an ink-receiving layer 3.

Portions of the ink-receiving layer on the black matrices 2 were then subjected to patterning exposure in an amount of energy of 100 mJ/cm$^2$ by deep UV rays through a photomask 4 having openings narrower than the width of the black matrix 2. The thus-exposed ink-receiving layer was then subjected to a heat treatment at 110° C. for 60 seconds. Using an ink-jet head 5, apertures of the ink-receiving layer were colored on a matrix pattern with dye inks of R, G and B colors. The inks thus applied were then dried at 90° C. for 5 minutes. The ink-receiving layer was subsequently subjected to a heat treatment at 200° C. for 60 minutes to set it, thereby producing a color filter according to the present invention.

The color filter for liquid crystal display device thus produced was observed through a light microscope. As a result, defects such as color mixing, color irregularity and blank areas were not observed.

This color filter was used to produce a liquid crystal display panel as illustrated in FIG. 5. The operation of this panel revealed that high-definition color images were able to be displayed.

EXAMPLES 3 TO 10

Color filters according to the present invention were produced in the same manner as in Example 2 except that their corresponding compositions shown in Table 1 were separately used. As a result, the same effects as those achieved in Example 2 were recognized.

TABLE 1

| Ex. | Component (a) | Component (b) |
|---|---|---|
| 3 | The same as that used in Example 2 | Halogenated triazine (trade name: TAZ-102*[1], product of Midori Kagaku K.K.) |
| 4 | The same as that used in Example 2 | Halogenated triazine (trade name: TAZ-104*[2], product of Midori Kagaku K.K.) |
| 5 | The same as that used in Example 2 | Halogenated triazine (trade name: TAZ-106*[3], product of Midori Kagaku K.K.) |
| 6 | The same as that used in Example 2 | Halogenated triazine (trade name: TAZ-110*[4], product of Midori Kagaku K.K.) |
| 7 | The same as that used in Example 2 | Halogenated triazine (trade name: TAZ-113*[5], product of Midori Kagaku K.K.) |
| 8 | Copolymer of N,N-dimethylolacrylamide and methyl methacrylate (compositional ratio of monomers = 50:50, Mw = 10,000) | The same as that used in Example 2 |
| 9 | Terpolymer of N,N-dimethylolacrylamide, styrene and hydroxyethyl acrylate (compositional ratio of monomers = 20:50:30, Mw = 5,000) | The same as that used in Example 2 |
| 10 | Tetrapolymer of N,N-dimethylolacrylamide, methyl methacrylate, acrylic acid and hydroxyethyl methacrylate (compositional ratio of monomers = 20:30:5:45, Mw = 15,000) | The same as that used in Example 2 |

*1

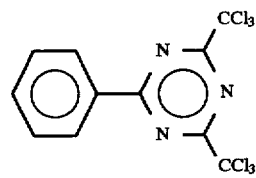

*2

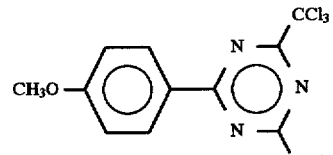

*3

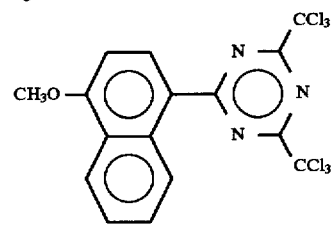

TABLE 1-continued

| Ex. | Component (a) | Component (b) |
|---|---|---|
| *4 | | |

$$\text{CH}_3\text{O}-\bigcirc-\text{CH}=\text{CH}-\underset{N}{\overset{N}{\bigcirc}}\begin{matrix}\text{CCl}_3\\N\\\text{CCl}_3\end{matrix}$$

*5

$$\underset{\text{CH}_3\text{O}}{\text{CH}_3\text{O}}-\bigcirc-\text{CH}=\text{CH}-\underset{N}{\overset{N}{\bigcirc}}\begin{matrix}\text{CCl}_3\\N\\\text{CCl}_3\end{matrix}$$

EXAMPLE 11

A two-pack type thermosetting resin composition was applied by spin coating onto the colored base obtained in Example 2 so as to give a coating thickness of 1 μm, and prebaked at 90° C. for 30 minutes, thereby forming a second resin layer. The second resin layer was then subjected to a heat treatment at 230° C. for 30 minutes to set it, thereby producing a color filter for liquid crystal display device.

The color filter for liquid crystal display device thus produced was observed through a light microscope. As a result, defects such as color mixing, color irregularity and blank areas were not observed.

This color filter was used to produce a liquid crystal display panel as illustrated in FIG. 5. The operation of this panel revealed that high-definition color images were able to be displayed.

EXAMPLE 12

A resin composition comprising 10 parts by weight of (a) the same terpolymer as that used in Example 2 and 0.2 part by weight of (b) diphenyliodonium triflate (trade name: DPI-105, product of Midori Kagaku K.K.) having the following structure

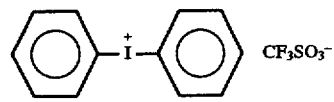

was applied by spin coating onto a glass base on which black matrices 2 had been formed as illustrated in FIG. 2A, so as to give a coating thickness of 1 μm, and prebaked at 70° C. for 10 minutes, thereby forming an ink-receiving layer 3.

Portions of the ink-receiving layer on the black matrices 2 were then subjected to patterning exposure in an amount of energy of 50 mJ/cm² by deep UV rays through a photomask 4 having openings narrower than the width of the black matrix 2. The thus-exposed ink-receiving layer was then subjected to a heat treatment at 110° C. for 60 seconds. Using an ink-jet head 5, apertures of the ink-receiving layer were colored on a matrix pattern with dye inks of R, G and B colors. The inks thus applied were then dried at 90° C. for 5 minutes. The ink-receiving layer was subsequently subjected to a heat treatment at 200° C. for 1 hour to set it, thereby producing a color filter according to the present invention.

15

The color filter for liquid crystal display device thus produced was observed through a light microscope. As a result, defects such as color mixing, color irregularity and blank areas were not observed. This color filter was used to produce a liquid crystal display panel as illustrated in FIG. 5. The operation of this panel revealed that high-definition color images were able to be displayed.

EXAMPLES 13 TO 20

Color filters according to the present invention were produced in the same manner as in Example 12 except that their corresponding compositions shown in Table 2 were separately used. As a result, the same effects as those achieved in Example 12 were recognized.

TABLE 2

| Ex. | Component (a) | Component (b) |
|---|---|---|
| 13 | The same as that used in Example 12 | Diphenyliodonium hexafluoroantimonate (trade name: DPI-103, product of Midori Kagaku K.K.) |
| 14 | The same as that used in Example 12 | Diphenyliodonium hexafluorophosphate (trade name: DPI-102, product of Midori Kagaku K.K.) |
| 15 | The same as that used in Example 12 | Diphenyliodonium tetrafluoroborate (trade name: DPI-101, product of Midori Kagaku K.K.) |
| 16 | The same as that used in Example 12 | Compound*6 of the following structure (trade name: MPI-105, product of Midori Kagaku K.K.) |
| 17 | The same as that used in Example 12 | Compound*7 of the following structure (trade name: BBI-105, product of Midori Kagaku K.K.) |
| 18 | The same as that used in Example 8 | The same as that used in Example 12 |
| 19 | The same as that used in Example 9 | The same as that used in Example 12 |
| 20 | The same as that used in Example 10 | The same as that used in Example 12 |

*6

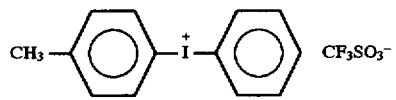

*7

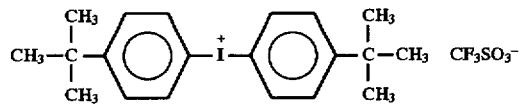

EXAMPLE 21

A two-pack type thermosetting resin composition was applied by spin coating onto the colored base obtained in Example 12 so as to give a coating thickness of 1 μm, and prebaked at 90° C. for 30 minutes, thereby forming a second resin layer. The second resin layer was then subjected to a heat treatment at 230° C. for 30 minutes to set it, thereby producing a color filter for liquid crystal display device.

The color filter for liquid crystal display device thus produced was observed through a light microscope. As a result, defects such as color mixing, color irregularity and blank areas were not observed.

This color filter was used to produce a liquid crystal display panel as illustrated in FIG. 5. The operation of this panel revealed that high-definition color images were able to be displayed.

16

EXAMPLE 22

A resin composition comprising 10 parts by weight of (a) the same terpolymer as that used in Example 2 and 0.2 part by weight of (b) triphenylsulfonium triflate (trade name: TPS-105, product of Midori Kagaku K.K.) having the following structure

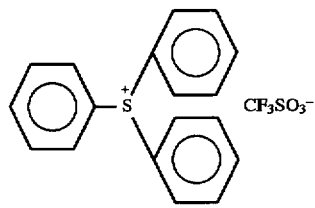

was applied by spin coating onto a glass base on which black matrices 2 had been formed as illustrated in FIG. 2A, so as to give a coating thickness of 1 μm, and prebaked at 70° C. for 10 minutes, thereby forming an ink-receiving layer 3.

Portions of the ink-receiving layer on the black matrices 2 were then subjected to patterning exposure in an amount of energy of 120 mJ/cm$^2$ by deep UV rays through a photomask 4 having openings narrower than the width of the black matrix 2. The thus-exposed ink-receiving layer was then subjected to a heat treatment at 110° C. for 60 seconds. Using an ink-jet head 5, apertures of the ink-receiving layer were colored on a matrix pattern with dye inks of R, G and B colors. The inks thus applied were then dried at 90° C. for 5 minutes. The ink-receiving layer was subsequently subjected to a heat treatment at 200° C. for 1 hour to set it, thereby producing a color filter according to the present invention.

The color filter for liquid crystal display device thus produced was observed through a light microscope. As a result, defects such as color mixing, color irregularity and blank areas were not observed.

This color filter was used to produce a liquid crystal display panel as illustrated in FIG. 5. The operation of this panel revealed that high-definition color images were able to be displayed.

EXAMPLES 23 TO 30

Color filters according to the present invention were produced in the same manner as in Example 22 except that their corresponding compositions shown in Table 3 were separately used. As a result, the same effects as those achieved in Example 22 were recognized.

TABLE 3

| Ex. | Component (a) | Component (b) |
|---|---|---|
| 23 | The same as that used in Example 22 | Triphenylsulfonium hexafluoroantimonate (trade name: TPS-103, product of Midori Kagaku K.K.) |
| 24 | The same as that used in Example 22 | Triphenylsulfonium hexafluorophosphate (trade name: TPS-102, product of Midori Kagaku K.K.) |
| 25 | The same as that used in Example 22 | Triphenylsulfonium tetrafluoroborate (trade name: TPS-101, product of Midori Kagaku K.K.) |
| 26 | The same as that used in Example 22 | Compound*8 of the following structure (trade name: MDI-105, prouct of Midori Kagaku K.K.) |
| 27 | The same as that used in Example 22 | Compound*9 of the following structure (trade name: DTS-102, product of Midori Kagaku K.K.) |

TABLE 3-continued

| Ex. | Component (a) | Component (b) |
| --- | --- | --- |
| 28 | The same as that used in Example 8 | The same as that used in Example 22 |
| 29 | The same as that used in Example 9 | The same as that used in Example 22 |
| 30 | The same as that used in Example 10 | The same as that used in Example 22 |

*8

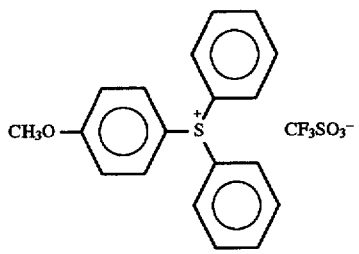

*9

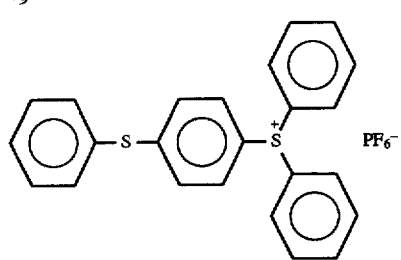

EXAMPLE 31

A two-pack type thermosetting resin composition was applied by spin coating onto the colored base obtained in Example 22 so as to give a coating thickness of 1 μm, and prebaked at 90° C. for 30 minutes, thereby forming a second resin layer. The second resin layer was then subjected to a heat treatment at 230° C. for 30 minutes to set it, thereby producing a color filter for liquid crystal display device.

The color filter for liquid crystal display device thus produced was observed through a light microscope. As a result, defects such as color mixing, color irregularity and blank areas were not observed.

This color filter was used to produce a liquid crystal display panel as illustrated in FIG. 5. The operation of this panel revealed that high-definition color images were able to be displayed.

EXAMPLES 32

The composition according to Example 2 was applied onto a glass base 1 as illustrated in FIG. 4B to form an ink-receiving layer 3. The thus-formed ink-receiving layer 3 was then subjected to patterning exposure in an amount of energy of 100 mJ/cm² by deep UV rays from the side of the ink-receiving layer using a photomask 4 to lower the ink absorptivity of the ink-receiving layer at the exposed portions thereof. Using an ink-jet head 5, unexposed portions of the ink-receiving layer were then colored on a matrix pattern with dye inks of R, G and B colors. The inks thus applied were then dried at 90° C. for 5 minutes. The ink-receiving layer was subsequently subjected to a heat treatment at 200° C. for 1 hour.

A protective layer 6 was then formed in the same manner as in Example 11, thereby producing a color filter for liquid crystal display device.

The color filter for liquid crystal display device thus produced was observed through a light microscope. As a result, defects such as color mixing, color irregularity and blank areas were not observed.

This color filter was used to produce a liquid crystal display panel as illustrated in FIG. 6. The operation of this panel revealed that high-definition color images were able to be displayed.

EXAMPLE 33

The composition according to Example 12 was applied onto a glass base 1 as illustrated in FIG. 4B to form an ink-receiving layer 3. The thus-formed ink-receiving layer 3 was then subjected to patterning exposure in an amount of energy of 250 mJ/cm² by deep UV rays from the side of the ink-receiving layer using a photomask 4 to lower the ink absorptivity of the ink-receiving layer at the exposed portions thereof. Using an ink-jet head 5, unexposed portions of the ink-receiving layer were then colored on a matrix pattern with dye inks of R, G and B colors. The inks thus applied were then dried at 90° C. for 5 minutes. The ink-receiving layer was subsequently subjected to a heat treatment at 200° C. for 1 hour.

A protective layer 6 was then formed in the same manner as in Example 21, thereby producing a color filter for liquid crystal display device.

The color filter for liquid crystal display device thus produced was observed through a light microscope. As a result, defects such as color mixing, color irregularity and blank areas were not observed.

This color filter was used to produce a liquid crystal display panel as illustrated in FIG. 6. The operation of this panel revealed that high-definition color images were able to be displayed.

EXAMPLE 34

The composition according to Example 22 was applied onto a glass base 1 as illustrated in FIG. 4B to form an ink-receiving layer 3. The thus-formed ink-receiving layer 3 was then subjected to patterning exposure in an amount of energy of 120 mJ/cm² by deep UV rays from the side of the ink receiving layer using a photomask 4 to lower the ink absorptivity of the ink-receiving layer at the exposed portions thereof. Using an ink-jet head 5, unexposed portions of the ink-receiving layer were then colored on a matrix pattern with dye inks of R, G and B colors. The inks thus applied were then dried at 90° C. for 5 minutes. The ink-receiving layer was subsequently subjected to a heat treatment at 200° C. for 1 hour.

A protective layer 6 was then formed in the same manner as in Example 21, thereby producing a color filter for liquid crystal display device.

The color filter for liquid crystal display device thus produced was observed through a light microscope. As a result, defects such as color mixing, color irregularity and blank areas were not observed.

This color filter was used to produce a liquid crystal display panel as illustrated in FIG. 6. The operation of this panel revealed that high-definition color images were able to be displayed.

EXAMPLE 35

A composition comprising 10 parts by weight of (a) a terpolymer (compositional ratio of monomers=20:30:50) of N,N-dimethylolacrylamide, methyl methacrylate and hydroxyethyl methacrylate and 0.2 part by weight of (b) triphenylsulfonium triflate (trade name: TPS-105, product of Midori Kagaku K.K.) and having a good water-based ink absorptivity, the ink absorptivity of which was lowered at its light-exposed portions by light irradiation and a heat treatment, was prepared and applied by spin coating onto a glass base on which black matrices had been formed, and was prebaked at 70° C. for 10 minutes to form an ink-receiving layer the ink absorptivity of which was lowered at its light-exposed portions by light irradiation and a heat treatment. At this time, the thickness of the coating film was 1 μm.

Portions of the ink-receiving layer on the black matrices were then subjected to patterning exposure in an amount of energy of 200 mJ/cm² by deep UV rays through a photomask having openings (Y, 30 μm) narrower than the width (X, 40 μm) of the black matrix. The thus-exposed ink-receiving layer was further subjected to a heat treatment for 1 minute on a hot plate heated to 100° C., thereby lowering the ink absorptivity of the exposed portions. Using an ink-jet printer, apertures of the ink-receiving layer were colored on a matrix pattern with dye inks of R, G and B colors. The inks thus applied were then dried at 90° C. for 5 minutes. The ink-receiving layer was subsequently subjected to a heat treatment at 230° C. for 1 hour to set the colored ink-receiving layer, thereby producing a color filter according to the present invention. Incidentally, a ratio of Y to X was 0.75.

The color filter for liquid crystal display device thus produced was observed through a light microscope. As a result, defects such as color mixing, color irregularity and blank areas were not observed.

EXAMPLE 36

A color filter according to the present invention was produced in exactly the same manner as in Example 35 except that the compositional ratio of the monomers in the terpolymer composed of N,N-dimethylolacrylamide, methyl methacrylate and hydroxyethyl methacrylate of the component (a) of the ink-receiving layer in Example 35 was changed to 5:90:5.

EXAMPLE 37

A color filter according to the present invention was produced in exactly the same manner as in Example 35 except that the compositional ratio of the monomers in the terpolymer composed of N,N-dimethylolacrylamide, methyl methacrylate and hydroxyethyl methacrylate of the component (a) of the ink-receiving layer in Example 35 was changed to 40:15:45.

EXAMPLE 38

A color filter according to the present invention was produced in exactly the same manner as in Example 35 except that the terpolymer composed of N,N-dimethylolacrylamide, methyl methacrylate and hydroxyethyl methacrylate of the component (a) of the ink-receiving layer in Example 35 was changed to a copolymer (compositional ratio of monomers=50:50) composed of N,N-dimethylol-acrylamide and methyl methacrylate.

The color filter for liquid crystal display device thus produced was observed through a light microscope. As a result, defects such as color mixing, color irregularity and blank areas were not observed.

EXAMPLE 39

A color filter according to the present invention was produced in exactly the same manner as in Example 35 except that the terpolymer composed of N,N-dimethylolacrylamide, methyl methacrylate and hydroxyethyl methacrylate of the component (a) of the ink-receiving layer in Example 35 was changed to a terpolymer (compositional ratio of monomers=10:40:50) composed of N,N-dimethylol-acrylamide, styrene and hydroxyethyl acrylate.

The color filter for liquid crystal display device thus produced was observed through a light microscope. As a result, defects such as color mixing, color irregularity and blank areas were not observed.

EXAMPLE 40

A color filter according to the present invention was produced in exactly the same manner as in Example 35 except that the terpolymer composed of N,N-dimethylolacrylamide, methyl methacrylate and hydroxyethyl methacrylate of the component (a) of the ink-receiving layer in Example 35 was changed to a tetrapolymer (compositional ratio of monomers=20:40:35:5) composed of N,N-dimethylol-acrylamide, methyl methacrylate, acrylic acid and hydroxyethyl acrylate.

The color filter for liquid crystal display device thus produced was observed through a light microscope. As a result, defects such as color mixing, color irregularity and blank areas were not observed.

EXAMPLE 41

A two-pack type thermosetting resin composition was applied by spin coating onto the colored base obtained in Example 35 so as to give a coating thickness of 1 μm, and prebaked at 90° C. for 30 minutes, thereby forming a second resin layer. The second resin layer was then subjected to a heat treatment at 230° C. for 30 minutes to set it, thereby producing a color filter for liquid crystal display device.

The color filter for liquid crystal display device thus produced was observed through a light microscope. As a result, defects such as color mixing, color irregularity and blank areas were not observed.

EXAMPLE 42

A composition comprising 10 parts by weight of (a) a terpolymer (compositional ratio of monomers=20:30:50) of N,N-dimethylolacrylamide, methyl methacrylate and hydroxyethyl methacrylate and 0.2 part by weight of (b) triphenylsulfonium triflate (trade name: TPS-105, product of Midori Kagaku K.K.) and having good water-based ink absorptivity, the ink absorptivity of which was lowered at its light-exposed portions by light irradiation and a heat treatment, was prepared and applied by spin coating onto a glass base on which no black matrices had been formed, and was prebaked at 70° C. for 10 minutes to form an ink-receiving layer the ink absorptivity of which was lowered at its light-exposed portions by light irradiation and a heat treatment. At this time, the thickness of the coating film was 1 μm.

Portions of the ink-receiving layer on the black matrices were then subjected to patterning exposure in an amount of energy of 200 mJ/cm² by deep UV rays through a photomask having openings (Y, 12 μm) narrower than the width (X, 20 μm) of a black matrix to be formed on an opposite base. The thus-exposed ink-receiving layer was further subjected to a heat treatment for 1 minute on a hot plate heated to 100° C., thereby lowering the ink absorptivity of the exposed portions. Using an ink-jet printer, apertures of the ink-receiving layer were colored on a matrix pattern with dye inks of R, G and B colors. The inks thus applied were then dried at 90° C. for 5 minutes. The ink-receiving layer was subsequently subjected to a heat treatment at 230° C. for 1 hour to set the colored ink-receiving layer, thereby producing a color filter according to the present invention. Incidentally, a ratio of Y to X was 0.6.

EXAMPLE 43

A color filter according to the present invention was produced in exactly the same manner as in Example 35 except that a copolymer (compositional ratio of monomers= 40:60) composed of N,N-dimethoxymethylacrylamide and methyl methacrylate was used in place of the terpolymer composed of N,N-dimethylolacrylamide, methyl methacrylate and hydroxyethyl methacrylate of the component (a) of the ink-receiving layer in Example 35.

The color filter for liquid crystal display device thus produced was observed through a light microscope. As a result, defects such as color mixing, color irregularity and blank areas were not observed.

The use of the production process of a color filter for liquid crystal display device according to the present invention permits the economical production of color filters for liquid crystal display device, which are excellent in heat resistance and solvent resistance, free of defects such as color mixing, color irregularity and blank areas, superb in smoothness and hence high in reliability.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A process for producing a color filter in which colorant is imparted on a base by an ink jet printing system, comprising the steps of:

(1) providing an ink-receiving layer on the base; and
(2) applying inks to the ink-receiving layer by the ink-jet printing system to form a pattern of different colors, wherein the ink-receiving layer comprises a homopolymer of a monomer having a structural unit represented by the formula:

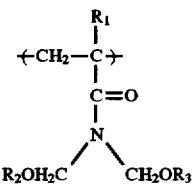

wherein R₁ denotes hydrogen or a methyl group, and R₂ and R₃ are, independently of each other, hydrogen or an alkyl group having 1 to 5 carbon atoms, or its copolymer with one or more other vinyl monomers.

2. The production process according to claim 1, wherein the monomer represented by the formula (I) is selected from the group consisting of N,N-dimethylolacrylamide, N,N-dimethoxymethylacrylamide, N,N-diethoxymethylacrylamide, N,N-dimethylolmethacrylamide, N,N-dimethoxymethylmethacrylamide and N,N-diethoxymethylmethacrylamide.

3. The production process according to claim 1, wherein the other vinyl monomers are selected from the group consisting of acrylic acid, methacrylic acid, methyl acrylate, ethyl acrylate, methyl methacrylate, ethyl methacrylate, hydroxymethyl methacrylate, hydroxyethyl methacrylate, hydroxymethyl acrylate, hydroxyethyl acrylate, styrene, α-methyl styrene, acrylamide, methacrylamide, acrylonitrile, allylamine, vinylamine, vinyl acetate and vinyl propionate.

4. The production process according to claim 1, wherein the weight average molecular weight of the polymer falls within a range of from $10^2$ to $10^7$.

5. The production process according to claim 1, wherein the copolymer contains a hydrophilic monomer component in an amount of from 5 to 95% by weight.

6. The production process according to claim 1, wherein the base has light-transmitting areas and light-screening areas.

7. The production process according to claim 1, further comprising step (3) of setting the ink-receiving layer after the step (2).

8. The production process according to claim 7, further comprising step (4) of forming a protective layer on the ink-receiving layer after the step (3).

9. A process for producing a liquid crystal display, panel comprising the steps of:

(1) forming a color filter base according to any of claims 1 to 6, 7 or 8;
(2) providing a base having a pixel electrode; and
(3) enclosing a liquid crystal compound in a space between the color filter base and the base having the pixel electrode.

10. The process according to claim 9, wherein the base having the pixel electrode has shade portions.

11. A process for producing a color filter in which colorant is imparted on a base by an ink jet printing system, comprising the steps of:

(1) providing on the base an ink-receiving layer containing a composition having good water-based ink absorptivity which deteriorates by light exposure optionally followed by heating;
(2) subjecting the ink-receiving layer to a patterning exposure optionally followed by heating to deteriorate the ink absorptivity of the ink-receiving layer, and
(3) applying inks to unexposed portions of the ink-receiving layer by the ink-jet printing system to form a pattern of different colors;

wherein the ink-receiving layer comprises (a) a homopolymer of a monomer having a structural unit represented by the formula:

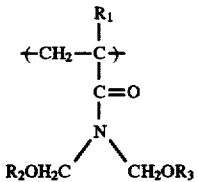

wherein R₁ denotes hydrogen or a methyl group, and R₂ and R₃ are, independently of each other, hydrogen or an alkyl group having 1 to 5 carbon atoms, or its copolymer with one or more other vinyl monomers, and (b) a photo-induced initiator.

12. The production process according to claim 11, wherein the monomer represented by the formula (I) is selected from the group consisting of N,N- dimethylolacrylamide, N,N-dimethoxymethylacrylamide, N,N-diethoxymethylacrylamide, N,N-dimethylolmethacrylamide, N,N-dimethoxymethylmethacrylamide and N,N-diethoxymethylmethacrylamide.

13. The production process according to claim 11, wherein the other vinyl monomers are selected from the group consisting of acrylic acid, methacrylic acid, methyl acrylate, ethyl acrylate, methyl methacrylate, ethyl methacrylate, hydroxymethyl methacrylate, hydroxyethyl methacrylate, hydroxymethyl acrylate, hydroxyethyl acrylate, styrene, α-methyl styrene, acrylamide, methacrylamide, acrylonitrile, allylamine, vinylamine, vinyl acetate and vinyl propionate.

14. The production process according to claim 11, wherein the weight average molecular weight of the polymer falls within a range of from $10^2$ to $10^7$.

15. The production process according to claim 11, wherein the copolymer contains a hydrophilic monomer component in an amount of from 5 to 95% by weight.

16. The production process according to claim 11, wherein the photo-induced initiator is selected from the group consisting of halogenated triazine compounds, diphenyliodonium salt derivatives and triphenylsulfonium salt derivatives.

17. The production process according to claim 16, wherein the diphenyliodonium salt derivatives are compounds represented by the formula

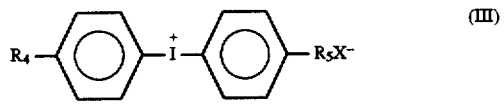

(III)

wherein $R_4$ and $R_5$ are, independently of each other, hydrogen, an alkoxyl group having 1 to 5 carbon atoms or a t-butyl group, and $X^-$ is $BF_4^-$, $PF_6^-$, $SbF_6^-$ or $CF_3SO_3^-$.

18. The production process according to claim 16, wherein the triphenylsulfonium salt derivatives are compounds represented by the formula

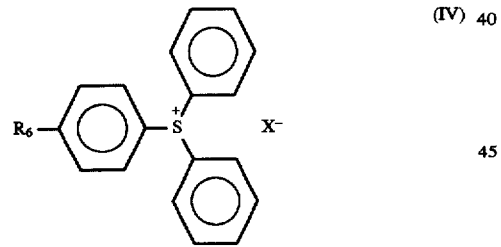

(IV)

wherein $R_6$ is hydrogen, an alkoxyl group having 1 to 5 carbon atoms, an alkyl group having 1 to 5 carbon atoms,

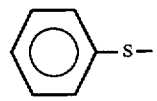

or fluorine, and $X^-$ has the same meaning as defined above.

19. The production process according to claim 11, wherein the base has light-transmitting areas and light-screening areas.

20. The production process according to claim 19, wherein parts of the ink-receiving layer on the light-screening areas are subjected to light exposure to deteriorate the ink absorptivity of the ink-receiving layer.

21. The production process according to claim 11, wherein the photo-induced initiator (b) is contained in a proportion of from 0.01 to 10 parts by weight per 100 parts by weight of the polymer (a).

22. The production process according to claim 11, further comprising step (4) of setting the ink-receiving layer after the step (3) by light exposure and/or heating.

23. The production process according to claim 22, further comprising step (5) of forming a protective layer on the ink receiving layer after the step (4).

24. A process for producing a liquid crystal display panel, comprising the steps of:

(1) forming a color filter base according to any of claims 11 to 21, 22 or 23;

(2) providing a base having a pixel electrode; and (3) enclosing a liquid crystal compound in a space between the color filter base and the base having the pixel electrode.

25. The process according to claim 24, wherein the base having the pixel electrode has shade portions.

* * * * *

UNITED STATES PATENT AND TRADEMARK OFFICE
CERTIFICATE OF CORRECTION

PATENT NO. : 5,716,739

DATED : February 10, 1998

INVENTOR(S) : AKIO KASHIWAZAKI ET AL.          Page 1 of 5

It is certified that error appears in the above-identified patent and that said Letters Patent is hereby corrected as shown below:

On the title page, item
AT [56] REFERENCES CITED

OTHER PUBLICATIONS

"(819)." should read --(P-819).--.

COLUMN 1

Line 8, "device" should read --devices--;
Line 13, "device" should read --devices--;
Line 19, "is however" should read --is, however,--;
Line 21, "for further spreading them." should read --to increase their availability.--;
Line 31, "oftenest" should read --most often--;
Line 48, "electrodepostion" should read --electrodeposition--; and
Line 64, "general" should read --common--.

COLUMN 2

Line 23, "device," should read --devices,--;
Line 33, "provided" should read --provide--; and
Line 67, "formula:" should read
--formula:

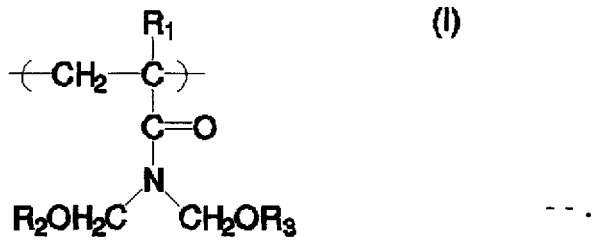

--.

UNITED STATES PATENT AND TRADEMARK OFFICE
CERTIFICATE OF CORRECTION

PATENT NO. : 5,716,739

DATED : February 10, 1998

INVENTOR(S) : AKIO KASHIWAZAKI ET AL.

It is certified that error appears in the above-identified patent and that said Letters Patent is hereby corrected as shown below:

COLUMN 4

Line 26, "device" should read --devices--;
    Line 28, "device" should read --devices--; and
    Line 33, "device," should read --devices,--.

COLUMN 5

Line 1, "however, are not" should read
        --however, these are not--;
    Line 4, "dealt as" should read --dealt with as--;
    Line 13, "limited these" should read --limited to these--;
    Line 22, "limited these" should read
        --limited to these--; and
    Line 56, "Apertures" should read --apertures--.

COLUMN 6

Line 29, "=CH-" should read --=CH-,--.

COLUMN 8

Line 65, "however, is" should read --however, this is--.

COLUMN 9

Line 10, "illustrates" should read --illustrate--.

UNITED STATES PATENT AND TRADEMARK OFFICE
CERTIFICATE OF CORRECTION

PATENT NO. : 5,716,739

DATED : February 10, 1998

INVENTOR(S) : AKIO KASHIWAZAKI ET AL.

It is certified that error appears in the above-identified patent and that said Letters Patent is hereby corrected as shown below:

COLUMN 10

Line 57, "ward" should read --word--; and
    Line 63, "Of" should read --of--.

COLUMN 11

Line 7, "date" should read --data--; and
    Line 66, "Examples." should read --examples.--.

COLUMN 12

Line 18, "device" should read --devices--.

COLUMN 15

Line 59, "device." should read --devices.--; and
    Line 60, "device" should read --devices--.

COLUMN 16

Line 34, "device" should read --devices--.

COLUMN 17

Line 40, "device." should read --devices.--;
    Line 41, "device" should read --devices--;
    Line 50, "EXAMPLES" should read --EXAMPLE--; and
    Line 67, "device." should read --devices.--.

UNITED STATES PATENT AND TRADEMARK OFFICE
CERTIFICATE OF CORRECTION

PATENT NO. : 5,716,739

DATED : February 10, 1998

INVENTOR(S) : AKIO KASHIWAZAKI ET AL.

It is certified that error appears in the above-identified patent and that said Letters Patent is hereby corrected as shown below:

COLUMN 18

Line 1, "device" should read --devices--;
    Line 26, "device." should read --devices.--;
    Line 28, "device" should read --devices--;
    Line 53, "device." should read --devices.--; and
    Line 54, "device" should read --devices--.

COLUMN 19

Line 28, "device" should read --devices--; and
    Line 60, "device" should read --devices--.

COLUMN 20

Line 23, "device" should read --devices--;
    Line 36, "device." should read --devices.--; and
    Line 37, "device" should read --devices--.

COLUMN 21

Line 17, "device" should read --devices--;
    Line 22, "device" should read --devices--; and
    Line 24, "device," should read --devices,--.

UNITED STATES PATENT AND TRADEMARK OFFICE
CERTIFICATE OF CORRECTION

PATENT NO. : 5,716,739

DATED : February 10, 1998

INVENTOR(S) : AKIO KASHIWAZAKI ET AL.

It is certified that error appears in the above-identified patent and that said Letters Patent is hereby corrected as shown below:

COLUMN 22

Line 25, "display, panel" should read --display panel--;
    Line 44, "layer, and" should read --layer; and--; and
    Line 47, "colors;" should read --colors,--.

Signed and Sealed this

Fifth Day of January, 1999

Attest:

Attesting Officer

Acting Commissioner of Patents and Trademarks